US010324195B2

(12) United States Patent
Garin et al.

(10) Patent No.: US 10,324,195 B2
(45) Date of Patent: Jun. 18, 2019

(54) VISUAL INERTIAL ODOMETRY ATTITUDE DRIFT CALIBRATION

(71) Applicant: QUALCOMM Incorporated, San Diego, CA (US)

(72) Inventors: Lionel Jacques Garin, Palo Alto, CA (US); Xinzhou Wu, Hillsborough, NJ (US); Jubin Jose, Bound Brook, NJ (US); Urs Niesen, Summit, NJ (US); Venkatesan Nallampatti Ekambaram, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 417 days.

(21) Appl. No.: 15/078,862

(22) Filed: Mar. 23, 2016

(65) Prior Publication Data
US 2017/0031032 A1 Feb. 2, 2017

Related U.S. Application Data

(60) Provisional application No. 62/197,510, filed on Jul. 27, 2015, provisional application No. 62/304,062, filed on Mar. 4, 2016.

(51) Int. Cl.
G01S 19/44 (2010.01)
G01S 19/45 (2010.01)
(Continued)

(52) U.S. Cl.
CPC ............. G01S 19/44 (2013.01); G01S 19/45 (2013.01); G01S 19/48 (2013.01); G01S 19/55 (2013.01); G01S 19/46 (2013.01); G01S 19/47 (2013.01)

(58) Field of Classification Search
CPC .......... G01S 19/44; G01S 19/45; G01S 19/46; G01S 19/47; G01S 19/48; G01S 19/55
(Continued)

(56) References Cited

U.S. PATENT DOCUMENTS 6,720,913 B1 4/2004 Schipper
7,221,313 B2 * 5/2007 Ganguly ................. G01S 19/23
342/174

(Continued)

FOREIGN PATENT DOCUMENTS

JP 5586994 B2 9/2014

OTHER PUBLICATIONS

International Search Report and Written Opinion—PCT/US2016/042286—ISA/EPO—dated Oct. 25, 2016.
(Continued)

Primary Examiner — Chuong P Nguyen
(74) Attorney, Agent, or Firm — Silicon Valley Patent Group LLP

(57) ABSTRACT

Disclosed embodiments pertain to a method on a UE may comprise determining a first absolute position of the UE at a first time based on GNSS measurements from a set of satellites. At a second time subsequent to the first time, the UE may determine a first estimate of displacement of the UE relative to the first absolute position using non-GNSS measurements. Further, at the second time, the UE may also determine a second estimate of displacement relative to the first absolute position and/or a second absolute position of the UE based, in part, on: the GNSS carrier phase measurements at the first time from the set of satellites, and GNSS carrier phase measurements at the second time from a subset comprising two or more satellites of the set of satellites, and the first estimate of displacement of the UE.

30 Claims, 10 Drawing Sheets

(51) Int. Cl.
*G01S 19/48* (2010.01)
*G01S 19/55* (2010.01)
*G01S 19/46* (2010.01)
*G01S 19/47* (2010.01)

(58) Field of Classification Search
USPC .............. 342/357.27, 357.28, 357.29, 357.3, 342/357.31, 357.38
See application file for complete search history.

(56) References Cited

U.S. PATENT DOCUMENTS

| | | | | |
|---|---|---|---|---|
| 7,532,159 | B2* | 5/2009 | Zhi | G01S 19/23 342/357.62 |
| 8,164,514 | B1 | 4/2012 | Yang et al. | |
| 8,350,756 | B2* | 1/2013 | Thomson | G01S 19/09 342/357.43 |
| 8,558,738 | B2* | 10/2013 | Ladd | G01S 19/235 342/357.62 |
| 9,182,497 | B2* | 11/2015 | Geier | G01S 19/49 |
| 2006/0012493 | A1 | 1/2006 | Karlsson et al. | |
| 2011/0039517 | A1* | 2/2011 | Wigren | G01S 5/0252 455/404.2 |
| 2012/0221244 | A1 | 8/2012 | Georgy et al. | |
| 2013/0135145 | A1 | 5/2013 | Iwase | |
| 2013/0162470 | A1* | 6/2013 | Rousu | G01S 19/25 342/357.31 |
| 2013/0234885 | A1 | 9/2013 | Geier et al. | |
| 2015/0094952 | A1 | 4/2015 | Moeglein et al. | |
| 2015/0219767 | A1 | 8/2015 | Humphreys et al. | |
| 2017/0219717 | A1* | 8/2017 | Nallampatti Ekambaram | G01S 19/42 |
| 2018/0188032 | A1* | 7/2018 | Ramanandan | G01S 19/49 |
| 2018/0284149 | A1* | 10/2018 | Kommi | G01C 21/165 |

OTHER PUBLICATIONS

Traugott J., et al., "A Time-Relative Approach for Precise Positioning with a Miniaturized L1 GPS Logger," GNSS 2008—Proceedings of the 21st International Technical Meeting of the Satellite Division of the Institute of Navigation (ION GNSS), Sep. 19, 2008, pp. 1883-1894, XP056002773.

* cited by examiner

VISUAL INERTIAL ODOMETRY ATTITUDE DRIFT CALIBRATION

CROSS REFERENCE TO RELATED APPLICATIONS

This application claims the benefit of and priority to: U.S. Provisional Application No. 62/197,510 entitled "Visual Inertial Odometry Attitude Drift Calibration" filed Jul. 27, 2015, and U.S. Provisional Application No. 62/304,062 entitled "Visual Inertial Odometry Attitude Drift Calibration" filed Mar. 4, 2016. The above applications are both assigned to the assignee hereof and incorporated by reference, in their entireties, herein.

FIELD

The subject matter disclosed herein relates generally to terrestrial positioning systems, and in particular, to systems and methods for attitude and displacement drift calibration of systems using visual inertial odometry (VIO).

BACKGROUND

Advanced Driver Assistance Systems (ADAS) mapping and/or navigation systems may use a point cloud of LIght Detection And Ranging (LIDAR) measurements in a 360 degrees horizontal pattern around the vehicle, which is correlated with a previously obtained high accuracy georeferenced texture map. As one example, many ADAS demand absolute accuracy levels in the range of 1 meter or less and relative accuracy (e.g. between two successive positions in a time period) in the decimeter range. Therefore, to maintain accuracy levels, the maps are often frequently updated.

With Global Navigation Satellite Systems (GNSS) based mapping and/or navigation systems, GNSS accuracy may degrade significantly in urban canyons, where multipath effects may induce an absolute position error of the order of tens of meters (e.g. as much as 50 meters) and relative position error of the order several meters. In addition, accuracy may be further degraded by the limited availability of good GNSS measurements. For example, with GNSS measurements that use carrier phase to achieve higher accuracy, positioning accuracy is dependent on a constant lock obtained by maintaining a clear view to at least four satellites, which may not be possible due to environmental conditions (e.g. in urban canyons). Further, accurate GNSS positioning also relies on the presence of a nearby reference receiver, which may not be available in many situations. In instances where accelerometer or IMU based inertial systems are used inertial sensor drift and other biases prevent reliable and accurate position determination.

SUMMARY

In some embodiments, a method on a user equipment (UE) may comprise: determining a first absolute position of the UE at a first time (t1) based on GNSS measurements from a set of satellites at the first time (t1); determining, at a second time (t2), a first estimate of displacement of the UE relative to the first absolute position, wherein the second time (t2) is subsequent to the first time (t1), wherein the first estimate of displacement is determined using non-GNSS measurements; and determining, at the second time (t2), a second estimate of displacement of the UE relative to the first absolute position based, in part, on: GNSS carrier phase measurements at the first time (t1) from the set of satellites, and GNSS carrier phase measurements at the second time (t2) from a subset comprising two or more satellites of the set of satellites, and the first estimate of displacement of the UE.

In another aspect, a User Equipment (UE) may comprise: a GNSS receiver capable of performing GNSS measurements; at least one non-GNSS displacement sensor to determine UE displacement; a memory to store the GNSS measurements and the non-GNSS displacement sensor measurements; and a processor coupled to the GNSS receiver and the non-GNSS displacement sensor. In some embodiments, the processor may be configured to: determine a first absolute position of the UE at a first time (t1) based on GNSS measurements from a set of satellites at the first time (t1); determine, at a second time (t2), a first estimate of displacement of the UE relative to the first absolute position, wherein the second time (t2) is subsequent to the first time (t1), wherein the first estimate of displacement is determined using non-GNSS measurements from the at least one non-GNSS displacement sensor; and determine, at the second time (t2), a second estimate of displacement of the UE relative to the first absolute position based, in part, on: GNSS carrier phase measurements at the first time (t1) from the set of satellites, and GNSS carrier phase measurements at the second time (t2) from a subset comprising two or more satellites of the set of satellites, and the first estimate of displacement of the UE.

In a further aspect, a User Equipment (UE) may comprise: GNSS receiving means capable of performing GNSS measurements; at least one non-GNSS displacement sensing means to determine UE displacement; means for determining a first absolute position of the UE at a first time (t1) based on GNSS measurements from a set of satellites at the first time (t1); means for determining, at a second time (t2), a first estimate of displacement of the UE relative to the first absolute position, wherein the second time (t2) is subsequent to the first time (t1), wherein the first estimate of displacement is determined using non-GNSS measurements determined by the non-GNSS displacement sensing means; and means for determining, at the second time (t2), a second estimate of displacement of the UE relative to the first absolute position based, in part, on: GNSS carrier phase measurements at the first time (t1) from the set of satellites, and GNSS carrier phase measurements at the second time (t2) from a subset comprising two or more satellites of the set of satellites, and the first estimate of displacement of the UE.

In another aspect, a non-transitory computer readable medium may comprise instructions, which when executed by a processor, cause the processor to: determine a first absolute position of a User Equipment (UE) at a first time (t1) based on GNSS measurements from a set of satellites at the first time (t1); determine, at a second time (t2), a first estimate of displacement of the UE relative to the first absolute position, wherein the second time (t2) is subsequent to the first time (t1), wherein the first estimate of displacement is determined using non-GNSS measurements; and determine, at the second time (t2), a second estimate of displacement of the UE relative to the first absolute position based, in part, on: GNSS carrier phase measurements at the first time (t1) from the set of satellites, and GNSS carrier phase measurements at the second time (t2) from a subset comprising two or more satellites of the set of satellites, and the first estimate of displacement of the UE.

The methods disclosed may be performed by a UE, including mobile stations, mobile devices, etc. using a combination of GNSS signals, including carrier phase measurements, Visual Inertial Odometry and in conjunction with terrestrial wireless systems, including LPP, LPPe, or other protocols. Embodiments disclosed also relate to software, firmware, and program instructions created, stored, accessed, read, or modified by processors using non transitory computer readable media or computer readable memory.

DETAILED DESCRIPTION

Figure 1:
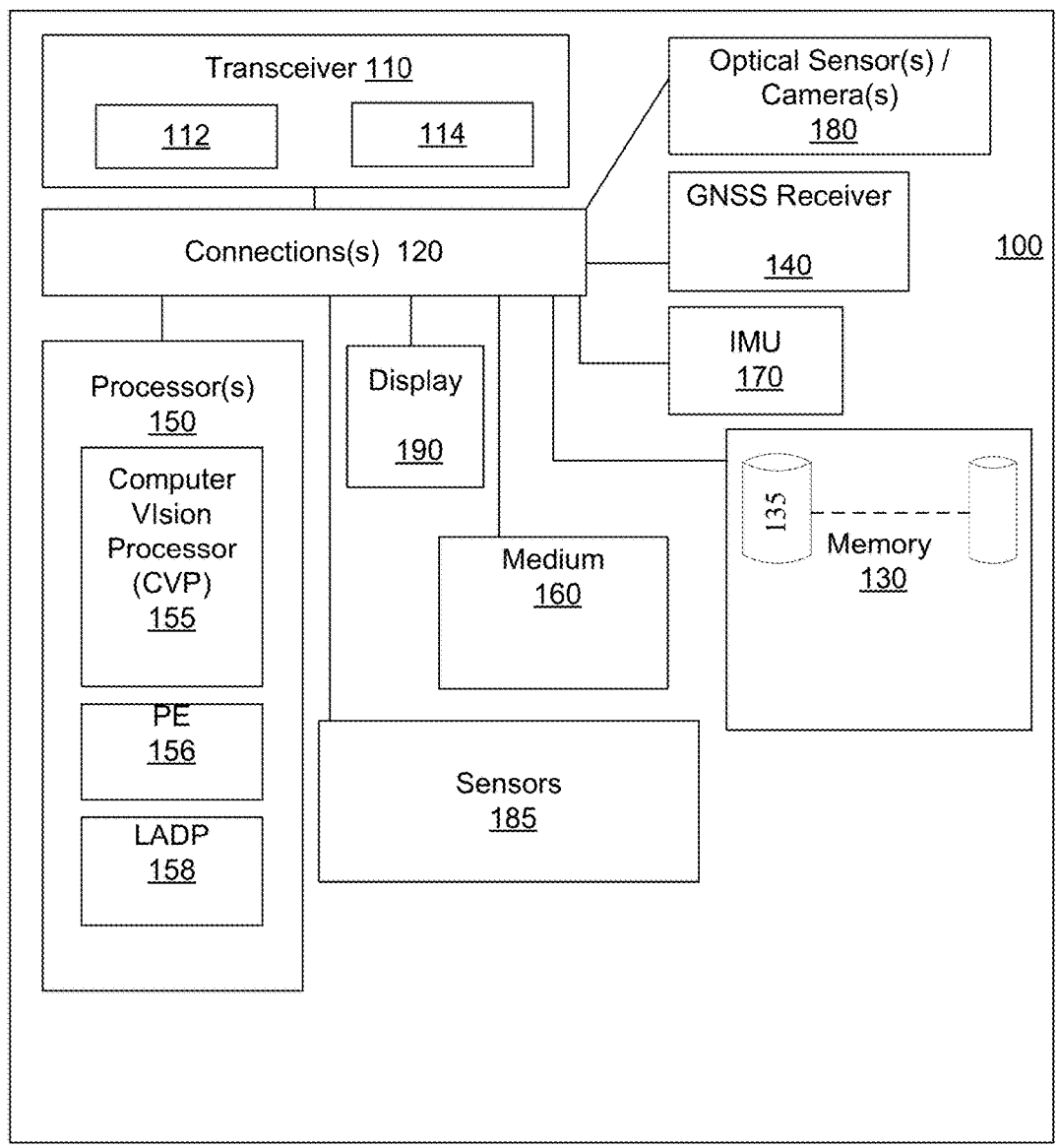
FIG. 1 shows a schematic block diagram illustrating certain exemplary features of an UE enabled to support position determination in accordance with disclosed embodiments.

In mapping and/or navigation systems, such as ADAS (Advanced Driver Assistance Systems) applications, mapping and/or navigation may use one or more continuous, reliable, and accurate sources of both absolute and relative positioning. ADAS mapping and/or navigation systems may use LIDAR measurements and/or RADAR measurements to obtain relative displacement estimates. The term "relative positioning" or "relative displacement" is used herein to refer to a baseline vector between two positions occupied by a single mapping/navigation entity, such as a single vehicle, or a single user equipment, or a single mobile station over a time period. In some instances, the relative displacement may be expressed in an absolute reference framework. "Relative Positioning" as described above is therefore different from the instantaneous baseline vector between two distinct receivers (e.g. a reference and a rover) at a point in time.

Some disclosed embodiments pertain to a time based relative velocity solution using a GNSS-VIO hybrid approach that combines Visual Inertial Odometry (VIO) with GNSS. The term "odometry" refers to the estimation of changes in position over time based on measurements from sensors. In VIO, several visual features may be tracked from frame to frame, which may be used to determine an accurate estimate of relative camera motion. In some embodiments, available GNSS measurements (e.g. carrier phase measurements) that meet quality parameters but are time-separated (e.g. by widely spaced measurement time windows) are stitched together using relative displacement and position obtained from measurements by alternate (non-GNSS) sensors and/or techniques. GNSS signal quality parameters may include, for example, whether Line Of Sight (LOS) exists to a subset of the visible GNSS satellites, the extent of GNSS signal degradation due to multipath (MP) etc.

The relative displacement and position between two time separated GNSS positioning locations may be obtained using various sensors/techniques and may include the use of images captured by cameras/optical sensors and/or measurements by Inertial Measurement Units (IMUs). Relative displacement and position between two GNSS positioning occasions may also be determined using LIDAR or Radio Detection and Ranging (RADAR). LIDAR refers to remote sensing technology that measures distance by illuminating a target (e.g. with a laser or other light) and analyzing the reflected light. In some embodiments, VIO based techniques may be used to determine relative displacement and position between two or more locations where GNSS measurements that meet quality parameters are available. For example, in a situation where GNSS measurements meeting quality parameters are available at a time t1 and then available at another later time t2, but unavailable between t1 and t2, then, VIO and/or an alternate sensor based technique of similar accuracy may be used to determine relative displacement and position between times t1 and t2. The time separated GNSS measurements obtained during positioning may include GNSS carrier phase measurements and/or GNSS code phase measurements.

The term "multipath" is used to refer to errors that occur when a UE receives a mix of direct and indirect signals or indirect-only signals (Non Line of Sight). The indirect signals may come from surrounding buildings or from atmospheric conditions affecting signals from satellites at low elevations relative to the horizon. Disclosed embodiments facilitate relative motion and position determination when the number of visible satellites is less than the number used during traditional (e.g. 4 or more satellites for a three-dimensional (3D) mode) position calculation.

In some embodiments, time-separated Line Of Sight (LOS) GNSS measurements that include carrier phase measurements without multipath may be stitched together based on VIO, for example, by dead reckoning with a camera or image sensor. In some embodiments, the GNSS measurements, when available, may also be used to correct VIO drift, offset and misalignment errors. In some embodiments, measurements can be stitched together by fusing GNSS measurements collected, for example, at a time t1, with measurements from another sensor (e.g. camera and/or IMU and/or LIDAR and/or RADAR and/or another method) or technique that determines an accurate relative motion vector between a time t1 and another time t2. In some embodiments, parameters for GNSS measurements at time t2 may be determined based on the GNSS measurements at time t1 and the accurate relative motion vector between times t1 and t2.

Some disclosed embodiments may be viewed as facilitating the transport of discontinuous GNSS measurements collected at a first time t1 to another second time epoch t2, using relative displacement information obtained from another non-GNSS sensor/technique (e.g. VIO/IMU/LI- DAR/RADAR based) of similar accuracy. In some embodiments, position continuity may be maintained by propagating the last fix based on the displacement measured since that last fix. Thus, a fix at time t1 may be propagated to a time t2 based on displacement measured since t1. In some embodiments, computation of a translation and/or rotation matrix to obtain measurements in an absolute frame of reference from the local non-GNSS/displacement sensor frame of reference may be performed in conjunction with the position fix.

In some embodiments, GNSS carrier phase measurements that meet quality parameters may be collected at both t1 and t2, VIO based techniques may be used to determine displacement between times t1 and t2, and carrier phase integer ambiguity resolution may be performed for the GNSS measurements.

In classical Real Time Kinematic (RTK), GNSS measurements are simultaneously collected from two receivers: a Reference receiver and from a Rover (moving) receiver to resolve carrier phase ambiguities. In classical RTK, the term "Relative Positioning" refers to the instantaneous baseline vector between two distinct receivers (e.g. a reference and a rover) at a point in time.

In some disclosed embodiments, data from the same receiver, but collected at different times, may be used to resolve carrier phase ambiguities. As one example, for computations, the position p1 of UE at time t1 may be considered as the "rover receiver" position, while the position p2 of the UE at time t2 may be considered the as the "reference receiver" position.

In some embodiments, fast resolution of integer ambiguities may be facilitated because disclosed techniques may tightly constrain VIO-measured relative displacement to relatively high accuracy levels. Accordingly, in some embodiments, the VIO-measured relative displacement may be used, in part, to resolve ambiguities and facilitate real time position determination even when cycle slips occur. In some embodiments, carrier phase ambiguities between two successive positions occupied by the receiver may be resolved using the Vernier principle. In the Vernier principle, two scales (e.g. VIO-based and carrier phase based) with different periodicities or graduations may be used to increase the accuracy of the measured displacement between the two successive receiver positions.

Disclosed embodiments also resolve other biases relating to position determination such as those arising from non-simultaneous GNSS measurements, the motion of satellites between times t1 and t2, ionospheric delays partial spatial decorrelation, receiver clock drift, etc. In some embodiments, the techniques disclosed may also be used for and/or in conjunction with Precise Point Positioning (PPP) techniques that facilitate global location determination with high accuracy using a single GNSS receiver.

The terms "User Device" (UD) or "user equipment" (UE) are used interchangeably herein and may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND. The UE may represent a mobile telephone, notepad computer, or laptop, or it may be a vehicle that collects measurement sets for the purpose providing a real time position and/or map creation.

In addition, the terms UD, UE, "mobile station" "mobile device" or "target" are intended to include all devices, including wireless and wireline communication devices, computers, laptops, etc. which are capable of communication with a server, such as via the Internet, Wi-Fi, cellular wireless network, DSL network, packet cable network or other network, and regardless of whether satellite signal reception, assistance data reception, and/or position-related processing occurs at the device, at a server, or at another device associated with the network. Any operable combination of the above are also considered a "user device."

FIG. 1 shows a schematic block diagram illustrating certain exemplary features of UE 100 enabled to support mapping based on a combination of GNSS signal and sensor based measurements to compute relative displacement, including camera or other image based techniques. Further, in some embodiments, UE 100 may also support hybrid GNSS-VIO based position determination by combining image based techniques with GNSS carrier-phase signal measurements. The term "hybrid" is used to refer to the use of a combination of one or more of displacement sensor and/or VIO based techniques with GNSS signal based techniques to perform location determination in a manner consistent with embodiments disclosed herein.

UE 100 may, for example, include one or more processors or processor(s) 150, memory 130, a transceiver 110 (e.g., wireless network interface), and Satellite Positioning System (SPS) receiver/GNSS receiver 140 (hereinafter "GNSS receiver 140") and optical sensors/camera(s) 180. In some embodiments, UE 100 may also optionally or additionally include one or more of: a magnetometer, an altimeter, a barometer, and sensor bank 185 (collectively referred to as sensors 185). In some embodiments, UE 100 may include Inertial Measurement Unit (IMU) 170, non-transitory computer-readable medium 160, display 190, and memory 130, which may be operatively coupled to each other with one or more connections 120 (e.g., buses, lines, fibers, links, etc.). In certain example implementations, all or part of UE 100 may take the form of a chipset, and/or the like.

GNSS receiver 140 may be enabled to receive signals associated with one or more SPS/GNSS resources. Received SPS/GNSS signals may be stored in memory 130 and/or used by processor(s) 150 to determine a position of UE 100. In some embodiments, GNSS receiver 140 may include a code phase receiver and a carrier phase receiver, which may measure carrier wave related information. The carrier wave, which typically has a much higher frequency than the pseudo random noise (PRN) (code phase) sequence that it carries, may facilitate more accurate position determination. The term "code phase measurements" refer to measurements using a Coarse Acquisition (C/A) code receiver, which uses the information contained in the PRN sequence to calculate the position of UE 100. The term "carrier phase measurements" refer to measurements using a carrier phase receiver, which uses the carrier signal to calculate positions. The carrier signal may take the form, for example for GPS, of the signal L1 at 1575.42 MHz (which carries both a status message and a pseudo-random code for timing) and the L2 signal at 1227.60 MHz (which carries a more precise military pseudo-random code).

In some embodiments, carrier phase measurements may be used to determine position in conjunction with code phase measurements and differential techniques, when GNSS signals that meet quality parameters are available.

The use of carrier phase measurements along with differential correction can yield relative sub-decimeter position accuracy. In some embodiments, UE may use techniques based on or variants of real-time carrier phase differential GPS (CDGPS) to determine the position of UE at various point and times, when such measurements are available. The term "differential correction", as used conventionally, refers to corrections to carrier phase measurements determined by a reference station at a known location. The carrier phase measurements at the reference station may be used to estimate the residuals of (e.g. portions not corrected by navigation messages) satellite clock biases of visible satellites. The satellite clock biases are transmitted to "roving receivers" which use the received information to correct their respective measurements. In some embodiments, the position p1 of UE 100 at time t1 may be considered as the "rover receiver" position, while the position p2 of the UE at time t2 may be considered the as the "reference receiver" position and differential techniques may be applied to minimize or remove errors induced by satellite clock biases. Because the same receiver is used at time t1 and t2, no data needs to be actually transmitted from the "reference" receiver (i.e. receiver at time t1), to the "rover" receiver, (i.e. same receiver at time t2). In some embodiments, instead of the data transmission between rover and receiver that occurs in classical RTK, a local data buffering operation may be used to hold data at times t1 and t2.

The term "differential techniques" refers to techniques such as "single differencing", "double differencing" etc. where the qualifiers "single" "double" etc. refer traditionally to the number of satellites and the two receivers used in the differencing.

As used in relation to embodiments disclosed herein, "single differencing" refers to error reduction techniques that subtract GNSS carrier phase measurements at a UE 100 from a single satellite S at time t2 from GNSS carrier measurements at UE 100 from same satellite S at time t1. The term "double differencing", as used in relation to embodiments described herein, refers to the carrier phase double difference observable between the times t1 and t2, which may be obtained as the difference between the above single difference carrier phase observable for a satellite S_i and the above single difference carrier phase observable for a satellite S_j.

Transceiver 110 may, for example, include a transmitter 112 enabled to transmit one or more signals over one or more types of wireless communication networks and a receiver 114 to receive one or more signals transmitted over one or more types of wireless communication networks. Wireless communication networks may include, for example, Wireless Wide Area Networks (WWAN), including cellular networks, and/or Wireless Local Area Networks (WLANs).

In some embodiments, UE 100 may comprise optical sensors such as CCD or CMOS sensors and/or camera(s) 180. In some embodiments, optical sensors may include or be coupled to a LIDAR unit/lasers with associated instrumentation including scanners, photo-detectors and receiver electronics. Optical sensors/camera(s) are hereinafter referred to "camera(s) 180". Camera(s) 180 may convert an optical image into an electronic or digital image and may send captured images to processor(s) 150. For example, as shown in FIG. 1B, in some embodiments, camera(s) 180 may be housed separately, and may be operationally coupled to display 190, processor(s) 150 and/or other functional units in UE 100.

In some embodiments, UE 100 may also include Inertial Measurement Unit (IMU) 170. In some embodiments, IMU 170, which may comprise 3-axis accelerometer(s), 3-axis gyroscope(s), and/or magnetometer(s), may provide velocity, orientation, and/or other position related information to processor(s) 150. In some embodiments, IMU 170 may be configured to measure and output measured information synchronized to the capture of each image frame by camera(s) 180, and/or measurements taken by sensors 185 in UE 100. In some embodiments, the output of IMU 170 may be used, in part, by processor(s) 150 to determine a position and orientation of UE 100.

The term "non-GNSS displacement sensor" is used herein to refer to any combination of sensors that may be used to determine displacement. The term non-GNSS displacement sensor, as used herein, may refer to one or more of: IMUs, accelerometers, Visual Inertial Odometry (VIO) based on captured images, LIDAR etc. The term "non-GNSS measurements" may refer to measurements from any of the above sensors.

In some embodiments, the capture of GNSS measurements by UE 100 when available may be synchronized and/or correlated with the capture of images by camera(s) 180. Further, in some embodiments, the capture of non-GNSS measurements (e.g. by IMU 170) measurements may be synchronized with the capture of images by the camera(s) 180/UE 100. In some embodiments, IMU measurements, GNSS measurements, and captured images may be time-stamped and the measurements and images may be associated with each other based on the time stamps. The association of one or more measurements with image and/or with each other may occur concurrently with measurement/image recordation, and/or at a later point in time based on the timestamps associated with the measurements.

The term "measurement set" is used to refer to signal measurements performed by a UE at a measurement location at a point in time or within some specified interval of a point in time. The signal measurements made may be related to mapping and/or position determination. The signal measurements made may also depend on UE 100, the capabilities of UE 100, environmental characteristics and/or signal characteristics that are available for measurement by UE 100 at a specific location/time. Typically, a measurement set may comprise available GNSS measurements, VIO measurements (e.g. based on captured image(s) or LIDAR measurements), and IMU measurements, where each element of the measurement set may have been recorded within some specified time interval of a point in time. The measurement sets recorded by UE 100 may be stored in memory 130 on UE 100.

Processor(s) 150 may be implemented using a combination of hardware, firmware, and software. In some embodiments, processor(s) 150 may include Computer Vision Processor (CVP) 155, which may implement a variety of image processing, VIO, and Computer Vision (CV) functions.

In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processor(s) 150. For example, camera 180 may capture a series of 3-dimensional (3D) images from a Time-of-Flight camera, or associated pairs or multiple 2-dimensional (2D) frames captured by stereo, trifocal, or multifocal cameras. In some embodiments, camera(s) 180 may be a wearable camera, or an external camera, which may be operationally coupled to, but housed separately from, other functional units in UE 100. In one embodiment, images captured by camera(s) 180 may be in a raw uncompressed format and may be compressed prior to being processed and/or stored in memory 160. In some embodiments, image compression may be performed by processor(s) 150 (e.g. by CVP 155) using lossless or lossy compression techniques.

In some embodiments, camera 180 may be a depth sensing camera or may be coupled to depth sensors. The term "depth sensor" is used to refer to functional units that may be used to obtain depth information for an environment independently and/or in conjunction with camera(s) 180. In some embodiments, may comprise RGBD cameras, which may capture per-pixel depth (D) information when the depth sensor is enabled, in addition to color (RGB) images. As another example, in some embodiments, camera(s) 180 may take the form of a 3D Time Of Flight (3DTOF) camera. In embodiments with 3DTOF camera(s) 180, the depth sensor may take the form of a strobe light coupled to the 3DTOF camera(s) 180, which may illuminate objects in a scene and reflected light may be captured by a CCD/CMOS sensor in camera 110. Depth information may be obtained by measuring the time that the light pulses take to travel to the objects and back to the sensor. In some embodiments, UE 100 may include or be coupled to LIDAR sensors, which may provide measurements to estimate relative displacement of UE 100 between two locations.

As a further example, the depth sensor may take the form of a light source coupled to camera(s) 180. In one embodiment, the light source may project a structured or textured light pattern, which may consist of one or more narrow bands of light, onto objects in a scene. Depth information may then be obtained by exploiting geometrical distortions of the projected pattern caused by the surface shape of the object. In one embodiment, depth information may be obtained from stereo sensors such as a combination of an infra-red structured light projector and an infra-red camera registered to a RGB camera. In some embodiments, camera(s) 180 may be stereoscopic cameras capable of capturing 3 Dimensional (3D) images. In another embodiment, camera(s) 180 may include depth sensors that are capable of estimating depth information. For example, a depth sensor may form part of a passive stereo vision sensor, which may use two or more cameras to obtain depth information for a scene. The pixel coordinates of points common to both cameras in a captured scene may be used along with camera pose information and/or triangulation techniques to obtain per-pixel depth information. In some embodiments, depth sensors may be disabled, when not in use. For example, the depth sensor may be placed in a standby mode, or powered off when not being used. In some embodiments, processors 150 may disable (or enable) depth sensing at one or more points in time.

Processor(s) 150 may also execute software to process image frames captured by camera(s) 180. For example, processor(s) 150 and/or CVP 155 may be capable of processing one or more image frames received from camera(s) 180 to determine the pose of camera(s) 180 and/or UE 100, implementing various computer vision and image processing algorithms and/or performing VIO based on the images received from camera(s) 180. The pose of camera(s) 180 refers to the position and orientation of the camera(s) 180 relative to a frame of reference. In some embodiments, camera pose may be determined for 6-Degrees Of Freedom (6-DOF), which refers to three translation components (which may be given by X,Y,Z coordinates of a frame of reference) and three angular components (e.g. roll, pitch and yaw relative to the same frame of reference).

In some embodiments, the pose of camera(s) 180 and/or UE 100 may be determined and/or tracked by processor(s) 150 using a visual tracking solution based on image frames captured by camera(s) 180. In some embodiments, processor(s) 150 and/or CVP 155 may be implemented using dedicated circuitry, such as Application Specific Integrated Circuits (ASICs), Digital Signal Processors (DSPs), and/or dedicated processor.

In some embodiments, CVP 155 may implement various computer vision and/or image processing methods such as 3D reconstruction, image compression and filtering. CVP 155 may also implement computer vision based tracking, VIO, model-based tracking, Simultaneous Localization And Mapping (SLAM), etc. In some embodiments, the methods implemented by CVP 155 may be based on color or grayscale image data captured by camera(s) 180, which may be used to generate estimates of 6-DOF pose measurements of the camera. SLAM refers to a class of techniques where a map of an environment, such as a map of an environment being modeled by UE 100, is created while simultaneously tracking the pose of UE 100 relative to that map. SLAM techniques include Visual SLAM (VLSAM), where images captured by a camera, such as camera(s) 180 on UE 100, may be used to create a map of an environment while simultaneously tracking the camera's pose relative to that map. VSLAM may thus involve tracking the 6DOF pose of a camera while also determining the 3-D structure of the surrounding environment. In some embodiments, the techniques outlined above may identify salient feature patches or keypoints or feature descriptors in a captured image frames, which may be tracked in a subsequent image frames. Image feature descriptors may take the form of Scale Invariant Feature Transform (SIFT), Speeded-Up Robust Descriptors (SURF), etc., which are well-known in the art. The determined/stored image descriptors may be utilized at a later point by an image or object detector to determine the pose of a UE.

Tracking the pose of UE 100 and/or camera(s) 180 in a spatial coordinate system can be accomplished in a variety of ways. For example, GNSS signals may be unavailable during some time periods. The term "unavailable" in relation to GNSS signals is used to refer to one or more of: a temporary loss of lock and/or discontinuities and/or interruptions of GNSS signals; various environmental (including atmospheric, geographical, etc) conditions that may detrimentally affect reception and/or reliability of GNSS signals; and/or non-availability of GNSS signals. Where GNSS signals, such as carrier phase signals, are unavailable or unreliable, such as in dense outdoor environments (e.g. urban canyons), such tracking can be done using VIO based tracking, which, in some embodiments, may use a combination of visual and inertial tracking systems. For example, images captured by camera(s) 180 may be used in conjunction with measurements by IMU 170 and/or sensors in sensor bank 185 (e.g. altimeter, barometer, magnetometer etc.) to determine the pose of UE 100 and/or camera(s) 180. In another embodiment, depth data from a depth sensor, which may be captured in conjunction with the capture of a depth-image by camera(s) 180, may be used, in part, to compute camera pose In some embodiments, VIO based techniques may be used, in part, to correct for errors (such as biases and drift) in IMU 170. When available, GNSSS coordinates may also be used to provide location information.

In some embodiments, the pose of the camera may be used to recalibrate sensors in IMU 170, and/or to compensate for and/or remove biases from measurements of sensors 185 and/or sensors in IMU 170. For example, IMU 170 and/or sensors 185 may output measured information in synchronization with the capture of each image frame by camera(s) 180 by UE 100. When the camera pose can be estimated accurately, for example, based on the images (e.g. successful detection of one or more corresponding feature points in images) then the VIO estimated camera pose may be used to apply corrections to measurements by IMU 170 and/or sensors 185 and/or to recalibrate IMU 170/sensors 185, so that measurements by IMU 170/sensors 185 may more closely track the VIO determined pose.

In some embodiments, a hybrid VIO Tracker may incorporate an Extended Kalman Filter (EKF), providing various inputs to the EKF to track the pose of camera(s) 180 and/or UE 100. The Kalman Filter (KF) is a widely used method for tracking and pose estimation. Specifically, the KF operates recursively on a sequence of noisy input measurements over time to produce a statistically optimal estimate of the underlying system state, which may include estimates of unknown variables. The EKF linearizes non-linear models to facilitate application of the KF.

Further, in some embodiments, processor(s) 150 may further comprise a Positioning Engine (PE) 156 (hereinafter PE 156), which may use information derived from images, sensor and wireless measurements by UE 100 either independently, or in conjunction with received location assistance data to determine a position and/or a position uncertainty estimate for UE 100. PE 156 may be implemented using software, firmware, and/or dedicated circuitry, such as Application Specific Integrated Circuits (ASICs), Digital Signal Processors (DSPs), and/or dedicated processor (such as processor(s) 150).

Further, in some embodiments, processor(s) 150 may comprise Location Assistance Data Processor (LADP) 158 (hereinafter LADP 158), which may process location assistance information comprising multipath and visibility map assistance information, updated GNSS satellite almanac and/or ephemeris information, which may then be used by processor(s) 150 to select a signal acquisition/measurement strategy and/or determine a location. In some embodiments, processor(s) 150/LADP 158 may also be capable of processing various other assistance information such as Long Term Evolution (LTE) Positioning Protocol (LPP) or LPP extensions (LPPe) messages including assistance information either directly or in conjunction with one or more other functional blocks shown in FIG. 1. In some embodiments, PE 156 and/or LADP 158 may be used to obtain an initial absolute location of UE 100.

In some embodiments, UE 100 may include one or more UE antennas (not shown) which may be internal or external. UE antennas may be used to transmit and/or receive signals processed by transceiver 110 and/or GNSS receiver 140. In some embodiments, UE antennas may be coupled to transceiver 110 and GNSS receiver 140. In some embodiments, measurements of signals received (transmitted) by UE 100 may be performed at the point of connection of the UE antennas and transceiver 110. For example, the measurement point of reference for received (transmitted) RF signal measurements may be an input (output) terminal of the receiver 114 (transmitter 112) and an output (input) terminal of the UE antennas. In an UE 100 with multiple UE antennas or antenna arrays, the antenna connector may be viewed as a virtual point representing the aggregate output (input) of multiple UE antennas. In some embodiments, UE 100 may measure received signals including signal strength and TOA measurements and the raw measurements may be processed by processor(s) 150. In some embodiments, transceiver 110 may include and/or be coupled to a RADAR unit, which may be used to obtain non-GNSS displacement measurements.

The methodologies described herein may be implemented by various means depending upon the application. For example, these methodologies may be implemented using modules in hardware, firmware, software, or any combination thereof. For a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using code, procedures, functions, and so on that perform the functions described herein. Any machine-readable medium tangibly embodying instructions may be used in implementing the methodologies described herein. For example, software codes may be stored in a non-transitory computer-readable medium 160 or memory 130 that is connected to and executed by processor(s) 150. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates hybrid GNSS-VIO based location determination, image processing, and other tasks performed by CM 155, PE 156, and/or LADP 158, on processor(s) 150. For example, memory 160 may hold data, GNSS satellite measurements, captured still images, depth information, video frames, program results, as well as data provided by IMU 170 and sensors 185.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid GNSS-VIO based position determination Computer-readable media 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 112 indicative of instructions and data. The instructions and data may cause one or more processors to implement hybrid GNSS-VIO based position determination and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions 1108 stored thereon, which if executed by at least one processor(s) 150 may be operatively enabled to perform all or portions of the example operations as described herein. Computer readable medium 160 may be a part of memory 130.

Further, UE 100 may include a screen or display 190 capable of rendering color images, including 3D images. In some embodiments, display 190 may be used to display live images captured by camera(s) 180, Graphical User Interfaces (GUIs), program output, etc. In some embodiments, display 190 may comprise and/or be housed with a touchscreen to permit users to input data via some combination of virtual keyboards, icons, menus, or other Graphical User Interfaces (GUIs), user gestures and/or input devices such as a stylus and other writing implements. In some embodiments, display 190 may be implemented using a Liquid Crystal Display (LCD) display or a Light Emitting Diode (LED) display, such as an Organic LED (OLED) display. In other embodiments, for example as shown in FIG. 1B, display 190 may be housed separately and may be operationally coupled to camera 180, processor(s) 150, and/or other functional units in UE 100.

In some embodiments, processor(s) 150 may also receive input from one or more sensors in sensor bank 185 (also referred to as "sensors 185"), which may include, for example, a magnetometer, altimeter and/or barometer. The magnetometer may be capable of measuring the intensity and/or the direction of the Earth's magnetic field and may serve as a compass and/or provide an indication of a direction of travel of UE 100. The altimeter may be used to provide an indication of altitude above a calibrated level, while the barometer may provide an indication of atmospheric pressure, which may also be used to obtain a determination of altitude.

In some embodiments, sensors 185 may include one or more of an ambient light sensor, acoustic transducers such as microphones/speakers, ultrasonic transducers, and/or depth sensors, which may be used to acquire depth information and/or determine distance to a target. In general, the list of sensors above in not exhaustive and sensor bank 185 may include various other types of sensors and transducers which are increasingly being incorporated into user devices such as vehicle mounted devices, smartphones, and other mobile devices. In some embodiments, UE 100 may not include one or more sensors in sensor bank 185. For example, one or more of an altimeter, barometer, and/or magnetometer may be omitted.

Figure 2:
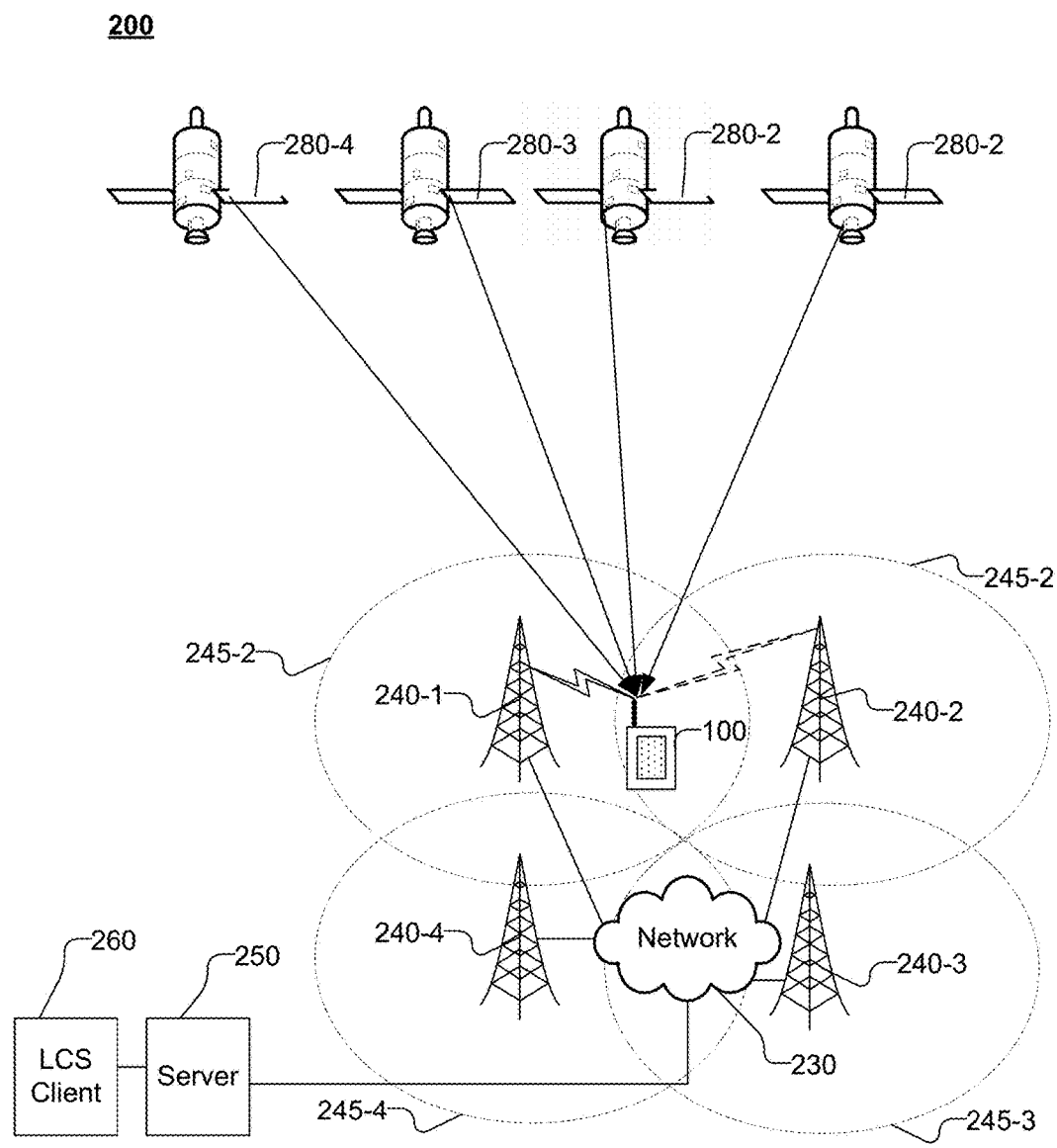
FIG. 2 shows an architecture of a system capable of providing Location, and/or Navigation services to UEs including the transfer of location assistance data or location information.

FIG. 2 shows an architecture of a system 200 capable of providing Location, and/or Navigation services to UEs 100. In some embodiments, system 200 may be used to transfer of location assistance data such as updated almanac or ephemeris data for one or more GNSS satellites to the UEs 100. In some instances, system 200 may be used for mapping or location services, such as for use with hybrid GNSS-VIO based location/mapping, in a manner consistent with embodiments disclosed herein.

For example, in some instances, based on the received location assistance data (e.g. by LADP 158 from server 250) UE 100 may obtain GNSS satellite measurements, which, in some instances, may be captured in conjunction with the capture of images by camera(s) 180. The captured images and/or measurements may be used locally by UE 100 to determine its location.

As illustrated in FIG. 2, the UE 100 may communicate with server 250 through network 230 and base station antennas 240-1-240-4, collectively referred to as antennas 240, which may be associated with network 230. Server 250 may, in some instances, provide the functionality of one or more of a location server, location assistance server, position determination entity (PDE), or another network entity. The transfer of the location and other information may occur at a rate appropriate to both UE 100 and server 250.

In some embodiments, system 100 may use messages such as LPP or LPPe messages between UE 100 and server 250. The LPP Protocol is well-known and described in various publicly available technical specifications from an organization known as the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

In some embodiments, UE 100 may receive location assistance information such as almanac/ephemeris data for one or more SVs (e.g. GNSS satellites) 280 from base station antennas 240, which may be used for position determination. Antennas 240 may form part of a wireless communication network, which may be a wireless wide area network (WWAN), wireless local area network (WLAN), etc. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from an organization known as the "3rd Generation Partnership Project" (3GPP).

Cdma2000 is described in documents from a consortium named "3rd Generation Partnership Project 2" (3GPP2). 3GPP and 3GPP2 documents are publicly available. A WLAN may be an IEEE 802.11x network. The techniques may also be implemented in conjunction with any combination of WWAN, WLAN, etc. For example, antennas 240 and network 230 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

UE 100 may also receive signals from one or more Earth orbiting Space Vehicles (SVs) 280 such as SVs 280-1-280-4 collectively referred to as SVs 280, which may be part of a GNSS. SVs 280, for example, may be in a GNSS constellation such as the US Global Positioning System (GPS), the European Galileo system, the Russian Glonass system, or the Chinese Compass system. In accordance with certain aspects, the techniques presented herein are not restricted to global satellite systems. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS/GNSS may include any combination of one or more global and/or regional navigation satellite systems and/or augmentation systems, and SPS/GNSS signals may include SPS, SPS-like, and/or other signals associated with such one or more SPS/GNSS. The SPS/GNSS may also include other non-navigation dedicated satellite systems such as Iridium or OneWeb. In some embodiments, GNSS receiver 140 may be configured to receive signals from one or more of the above SPS/GNSS/satellite systems.

For simplicity, only one UE 100 and server 250 are shown in FIG. 2. In general, system 100 may comprise multiple cells indicated by 245-$k$ (0≤$k$≤$N_{cells}$, where $N_{cells}$ is the number of cells) with additional networks 230, LCS clients 260, UDs 100, servers 250, (base station) antennas 240, and Space Vehicles (SVs) 280. System 100 may further comprise a mix of cells including microcells and femtocells in a manner consistent with embodiments disclosed herein.

UE 100 may be capable of wirelessly communicating with server 250 through one or more networks 230 that support positioning and location services to obtain an initial coarse location, which may be used in conjunction with almanac/ephemeris information to determine a more precise location using hybrid GNSS-VIO based position determination. For example, UE 100 may use a hybrid GNSS-VIO based position determination and compute its position based on measurements from one or more of: IMU 170, and/or captured images and/or, GNSS carrier phase observables (e.g. based on measurements of signals received from SVs 280).

Figure 3:
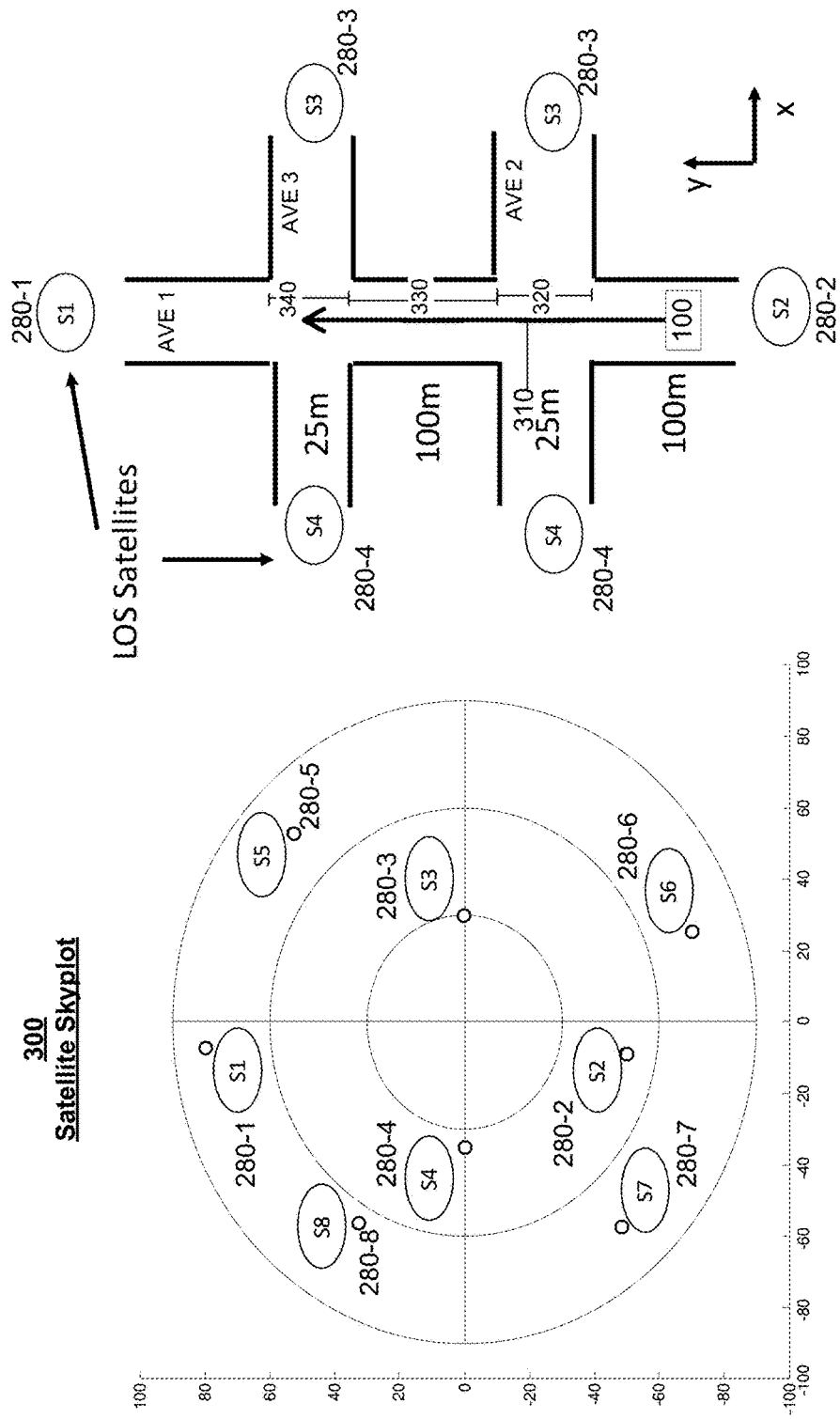
FIG. 3A shows an example skyplot of eight GNSS Satellite Vehicles at a point in time.
FIG. 3B shows a map of an exemplary urban environment with UE 100 and some GNSS Satellite Vehicles.

FIG. 3A shows an example skyplot 300 of eight GNSS SVs 280-1 through 280-8 at a point in time. FIG. 3B shows UE 100 in an urban environment. As shown in FIG. 3B, UE 100 is travelling along Avenue 1 along Path 310 starting at time point P0. As shown in FIG. 3B, UE 100 can receive LOS signals from GNSS SVs 280-1 and 280-2. However, because only 2 GNSS satellites are visible, UE 100 may not be able to determine a full 3D location. For example, signals from GNSS SVs 280-3, 280-4, 280-5, 280-6, 280-7, and 280-8 may be blocked or experience significant degradation due to an urban canyon environment thereby preventing full 3D GNSS position location by UE 100.

During section 320 (which may be a 25 m section formed by the intersection of Avenues 1 and 2), after travelling about 100 meters along path 310, at time t1, UE 100 may receive LOS signals from GNSS SVs 280-1, 280-2, 280-3 and 280-4. Accordingly, at point P1, UE 100 may be able to calculate a full accurate 3D location based on carrier phase measurements from LOS signals received from GNSS SVs 280-1, 280-2, 280-3 and 280-4.

However, when UE travels along section 330 of path 310, UE 100 may lose signals from GNSS SVs 280-3 and 280-4, which may be blocked or experience significant degradation including multipath due to the urban canyon environment.

UE 100 may obtain/re-acquire a lock on GNSS SVs 280-3 and 280-4 in 25 m section 340 (which may be formed by the intersection of Avenues 1 and 3) of path 310. For conventional GNSS location determination schemes using carrier phase observables, a constant lock with GNSS SVs 280-1, 280-2, 280-3, and 280-4 is needed to calculate UE position. Cycle slips, such as may occur in section 330, may prevent the use of traditional carrier phase based accurate GNSS position location.

In some embodiments, during movement in section 330, one or more non-GNSS based positioning techniques may be used to determine the location of UE 100 by measuring displacement relative to the last GNSS carrier phase determined position. The terms "non-GNSS positioning sensor" "non-GNSS positioning techniques", "non-GNSS position determination sensor" are used synonymously herein and refer to measurements by sensors and/or by techniques that do not depend on GNSS and may be used to determine the position of UE 100. For example, measurements provided by VIO and/or IMU 170 and/or a LIDAR sensor may be used to determine relative displacement. During travel in section 340, when UE 100 may re-acquire a lock on GNSS SVs 280-1, 280-2, 280-3 and 280-4, the known VIO determined location of UE 100 may be used to resolve carrier phase ambiguities as described further below.

Figure 4:
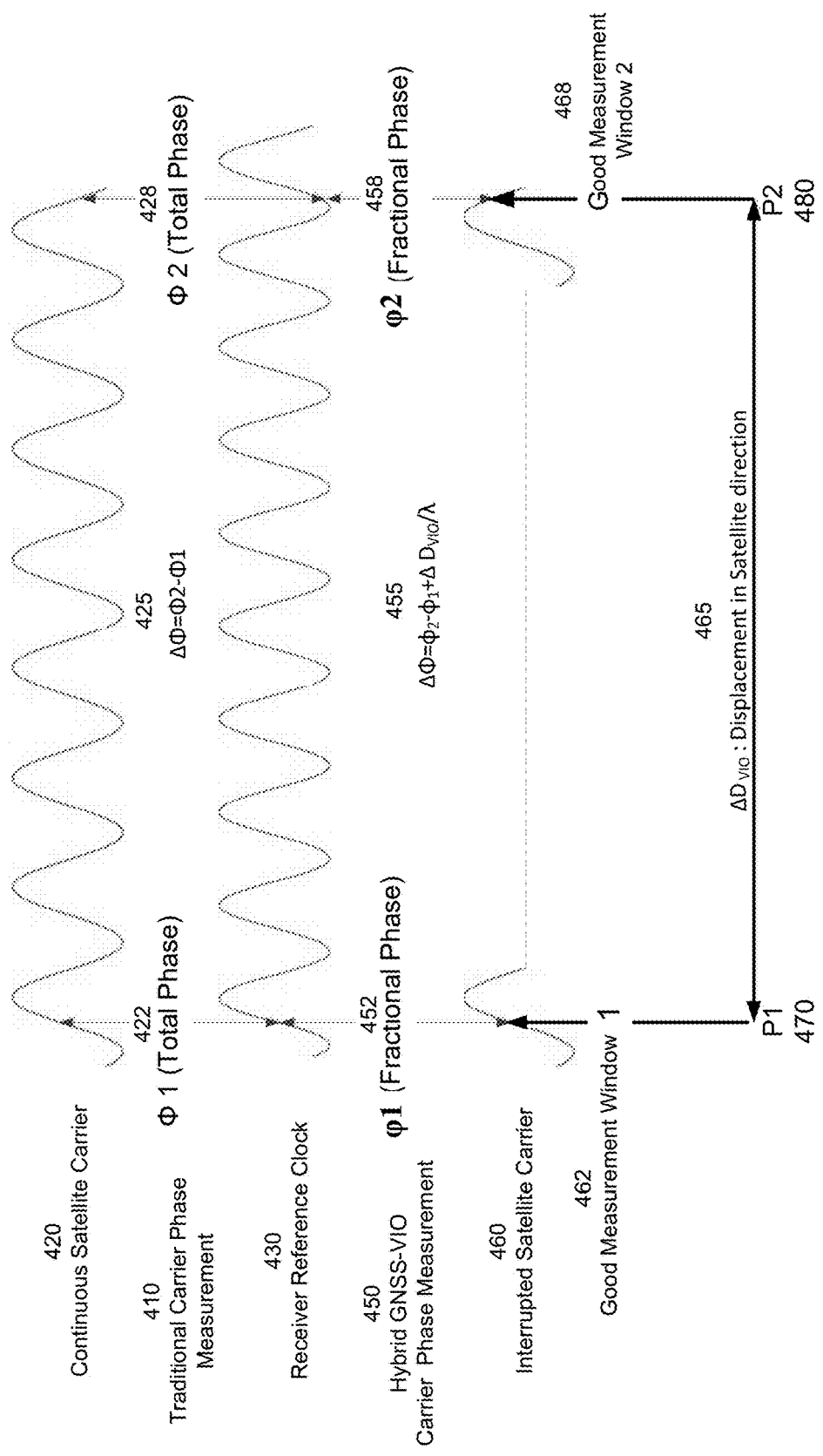
FIG. 4 shows traditional carrier phase measurements and exemplary hybrid GNSS-VIO carrier phase measurement in accordance with some embodiments disclosed herein.

FIG. 4 shows traditional carrier phase measurements 410 and exemplary Hybrid GNSS-VIO carrier phase measurement 450 in accordance with some disclosed embodiments. Traditional carrier phase measurement compares the continuous satellite carrier signal 420 with the receiver reference clock 430 to determine total phase $\phi 1$ 422, which may then be used to determine position P1 470 of a UE at a given time. In conventional techniques, continuous carrier phase measurements are used to determined position s at subsequent times. For example, if the phase at position P2 480 is $\phi 2$ 428, then the phase difference $\Delta\phi$ 425 of the total phase given by $\Delta\phi = \phi 2 - \phi 1$ of carrier signal 420 may be used to determine and track the position of a UE.

Carrier phase measurements include an integer cycle ambiguity or carrier phase ambiguity "N". The integer cycle ambiguity represents the number of full phase cycles between the satellite and the receiver at the time the receiver first locks on to a GNSS satellite signal. The integer cycle ambiguity does not change from the time the receiver locks on until the end of the observation period, unless the signal is interrupted and/or lock is lost. When the receiver reacquires the signal, the integer ambiguity has changed and the receiver count of the number of integer cycles from the time of initial lock is lost. Therefore, in conventional techniques loss of lock involves re-determining the integer ambiguity to when the carrier phase signal is reacquired. Further, the loss of lock also incurs a loss of accurate relative positioning until carrier phase signal reacquisition is achieved.

In conventional positioning, cycle slips, which may occur because of environmental reasons, may degrade positioning accuracy. Cycle slips refer to discontinuities or interruptions in the series of carrier-phase measurements due to a receiver temporarily losing its lock on the carrier of a GNSS signal. For example, as shown in FIG. 4, interrupted carrier signal 460 is lost between good measurement window 1 462 and good measurement window 2 468. During the time that GNSS signal is interrupted, in conventional carrier phase positioning, the receiver loses count of the number of consecutive changes in full phase cycles, which introduces errors and affects the accuracy and reliability of positioning. Thus, to maintain accuracy the process of resolving integer ambiguity is restarted. Moreover, because a loss of lock is not uncommon when odometry is performed in urban canyons, the use of carrier phase based techniques in conventional odometry has been constrained.

In some embodiments, using hybrid GNSS-VIO carrier phase measurements 450, the relative displacement in the satellite direction may be determined to be $\Delta D_{VIO}$ 465 between good measurement window 1 462 at position P1 470 and good measurement window 2 468 at position P2 480. In general, any non-GNSS positioning technique of similar accuracy may be used to determine the relative displacement in the satellite direction. In some embodiments, when GNSS carrier phase measurements are not available to UE 100 (e.g. after good measurement window 1 462), then VIO measurements may be taken until the GNSS carrier phase measurement is once again available at measurement good measurement window 2 468. Accordingly, the phase difference $\Delta\varphi$ 455 between good measurement window 1 462 and good measurement window 2 468 may be given by $$\Delta\varphi = \varphi2 - \varphi1 + \left(\frac{\Delta D_{VIO}}{\lambda}\right) \quad (1)$$

In some embodiments, Equation (1) may be used in a hybrid GNSS-VIO position determination system to calculate phase difference between two instants t1 and t2 in time when GNSS measurements are available, even if carrier phase GNSS signals are unavailable between times t1 and t2. When UE 100 first acquires GNSS signal from an SV at good measurement window 1, the acquisition may begin initially at some fractional phase $\varphi1$ 452. Similarly, when the hybrid GNSS-VIO system on UE 100 reacquires the GNSS signal from the same SV at good measurement window 2, the acquisition may restart at some fractional phase $\varphi2$ 458. In some embodiments, the relative displacement $\Delta D_{VIO}$ 465 in the satellite direction between points P1 470 and P2 480 may be measured using VIO or another non-GNSS method of similar accuracy. The relative displacement $\Delta D_{VIO}$ 465 may be used to calculate the phase difference $\Delta\varphi$ 455 using equation (1) above.

Figure 5:
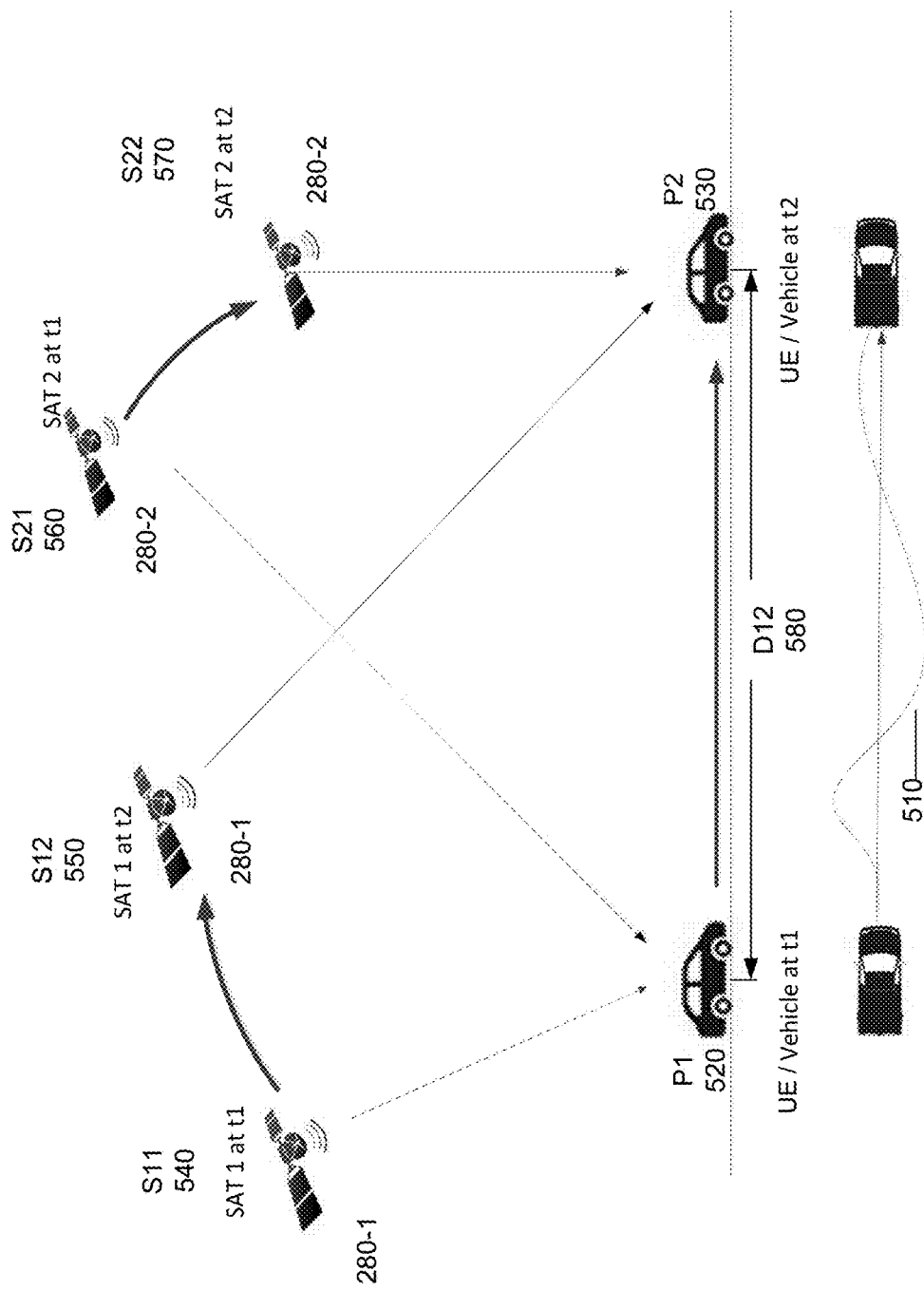
FIG. 5 shows a UE 100 which may be in a vehicle moving from a location P1 at time t1 to location P2 at time t2 along a path.

FIG. 5 shows a UE 100 which may be in a vehicle at location P1 520 at time t1 and travel to location P2 530 at time t2 along path 510 (shown by the dashed line). At time t1, SV 280-1 is at position S11 540, while at time t2, SV 280-1 is at position S12 550. Further, at time t1, SV 280-2 is at position S21 560, while at time t2, SV 280-2 is at position S22 570. In some embodiments, ephemeris data may be used to determine locations S11 540 and S21 560 at time t1. If the lock to one or more satellites is lost during travel on path 510, then, in some embodiments, non-GNSS positioning techniques (e.g. VIO) may be used to determine the position of UE 100 at time t2. Accordingly, in some embodiments, when carrier phase ambiguities are resolved at time t2, the movement of satellites between times t1 and t2 may be taken into account. For example, the displacement of UE 100 relative to SV 280-1 at satellite position S12 550 and SV 280-2 at position S22 570 may be determined and used to resolve carrier phase ambiguities. In some embodiments, ephemeris data may be used to determine locations S12 550 and S22 570 at time t2. In some embodiments, ephemeris data may be stored in memory 130 of UE 100 and/or an updated ephemeris may be obtained from wireless communication network 230 (FIG. 2).

In some embodiments, accuracy of a hybrid GNSS-VIO (or a hybrid system using GNSS with another non-GNSS positioning technique of similar accuracy) may be maintained by leveraging the integer nature of the ambiguities similar to when using Real Time Kinematics (RTK) or Carrier Phase relative positioning, or recent Precise Point Positioning/Real Time Kinematics (PPP/RTK) methods. Double differencing between a pair of satellites cancels out fractional part of the ambiguities; the remaining ambiguities are an integral number of wavelengths.

In some embodiments, the integer nature of the ambiguities may be exploited to: (i) increase the accuracy of VIO displacement measurement (e.g. to the order of a decimeter or less) thus compensating for VIO drift when aligning the local VIO spatial reference frame within a global reference frame; and (ii) to solve for all double difference ambiguities between two points successively occupied by the same GPS/GNSS receiver.

In some embodiments, UE 100, (which may be in a vehicle, including an aerial vehicle) may collect fractional carrier phase measurements for all visible satellites at a time t1 (which may correspond, for example, to good measurement window 1 462 in FIG. 4). In some embodiments, measurements may be collected for signals meeting preset quality parameters. For example, outliers may be detected and eliminated. As another example, signals with large multipath distortions may be detected and eliminated.

At time t2 (which may correspond, for example, to good measurement window 2 468 in FIG. 4), the same UE 100 collects another set of fractional carrier phase data, when good quality signals are available.

In some embodiments, VIO may be used to obtain an estimate of the relative displacement of UE 100 shown by length of D12 baseline 580 (or the distance) between position P1 520 at time t1 and position P2 530 at time t2. In some embodiments, the accuracy of the estimate may depend on the baseline distance between two locations.

Figure 6:
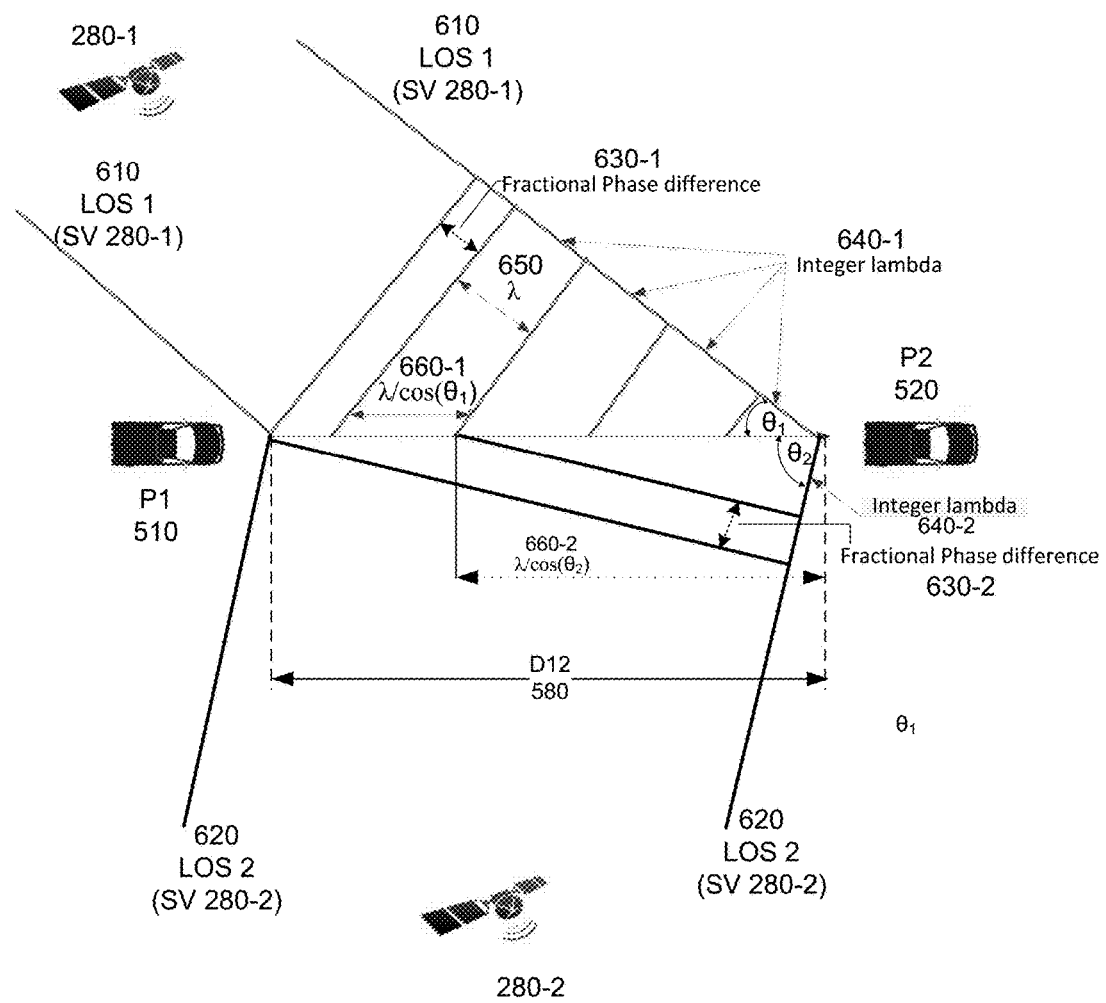
FIG. 6 illustrates an example of single difference carrier phase integer reconstruction/back projection according to some disclosed embodiments.

FIG. 6 illustrates an example of single difference carrier phase integer reconstruction/back projection according to some disclosed embodiments. FIG. 6 shows a simplified illustration of single difference case for a relative angle $\theta_i$, between the LOS of satellite 280-$i$ and UE displacement represented by D12 baseline 580. In some embodiments, when the elapsed time period between positions P1 and P2 is short, the angle of SVs 280 (e.g. SV 280-1) relative to positions P1 and P2 may be may be viewed as relatively constant over the time period.

The carrier phase difference measured for the satellite 280-1 at two positions P1 510 and P2 520 by the same receiver is projected onto the baseline between positions P1 510 and P2 520. In the single difference example of FIG. 6, for each satellite, the distance difference in the LOS direction of the satellite generates a periodic likelihood function due to the integer nature of the lambda carrier phase ambiguity. The periodic likelihood function can be thought as a series of narrow Gaussian curves, exhibiting a periodicity λ in the direction of the satellite.

The projected phase difference has a periodicity different from lambda (λ) 650. The periodicity of the projected phase difference may be obtained as $(\lambda/\cos(\theta_i))$, where $\theta_i$ is the angle between LOS direction of satellite 280-i and D12 baseline 580. FIG. 6 shows angle $\theta_1$ between LOS 1 610 of satellite 280-1 relative to D12 baseline 580 with full integral phase λ 650 periodicity given by $(\lambda/\cos(\theta_1))$ 660-1, and angle $\theta_2$ between LOS 2 6220 of satellite 280-2 relative to baseline 580 but with different periodicity $(\lambda/\cos(\theta_2))$ 660-2, due to different satellite to baseline angle.

As shown in FIG. 6, the likelihood function when re-projected onto the D12 baseline 580 exhibits a different periodicity given by, $\lambda/\cos(\theta_i)$ which depends on the relative angle $\theta_i$ between the LOS of satellite 280-i and the displacement (e.g. D12 baseline 580) baseline of UE 100. The likelihood of the difference of two projected single differences for SVs 280-1 and 280-2 provides another compound likelihood function of similar periodic behavior, but with a different periodicity given by $$\left(\frac{\lambda}{\cos(\theta_1)}\right) - \left(\frac{\lambda}{\cos(\theta_2)}\right).$$

When the angles $\theta_1$ and $\theta_2$ are close, the periodicity becomes arbitrarily large, and the number of possible solutions (i.e. for a non zero likelihood function) for the baseline becomes very small. The increase in periodicity interval may be accompanied by an increase in width of the non zero domains (uncertainty). In some embodiments, by multiplying all the projected double difference likelihood functions, along with the VIO likelihood function (e.g. a single Gaussian with standard deviation equal to the VIO displacement uncertainty), the number of non zero domains may be reduced and a unique VIO displacement solution may be obtained.

The combined likelihood function will have a very limited number of peaks. The correct length of D12 baseline 580 corresponds to one of the peaks. A first estimate of the length of D12 baseline 580 may be obtained based on the peak location. The first double difference solution is termed the "float ambiguity solution" or "float solution" because the ambiguities are estimated as real or floating point numbers. When the float solution is re-projected onto each satellite LOS, the float ambiguities are fixed and double difference integers may be solved and a single integer solution may be determined.

In some embodiments, the VIO displacement estimate may be obtained as a maximum of the combined likelihood function. The maximum of the combined likelihood function may exhibit a peak much narrower than the initial VIO uncertainty, thereby improving the VIO displacement solution beyond the VIO uncertainty. In some embodiments, each integer double difference ambiguity may then be extracted by subtracting the projected double difference fractional carrier phase from the computed VIO displacement estimate, and then dividing by the apparent periodicity along the baseline.

The above description is merely exemplary and for illustrative purposes only. Other integer ambiguity resolution approaches such as varying the displacement distance, and finding the maximum likelihood over the explored distance domain may also be used. In some embodiments, mixed float and integer variable maximum likelihood estimation techniques such as LAMBDA or Mixed Integers Least Squares (MILES) may be used. In some embodiments, the likelihood function re-projections are parameterized with the orientation and translation errors around initial rotation and translation matrices, and orientation and translation errors may be determined in conjunction with the VIO displacement.

In some embodiments, the accuracy of the D12 baseline 580 length estimate may be further improved by re-projecting the integer distance onto the D12 baseline 580, then averaging all estimates by a variance weight. For example, each double difference-based estimate of the baseline will have a different associated uncertainty, that is twice the carrier phase one-sigma noise (assuming that all 4 carrier phases have the same noise standard deviation), multiplied by the re-projection factor onto the baseline. The re-projection factor may be determined as $$\left(\frac{1}{\cos(\theta_1)}\right) - \left(\frac{1}{\cos(\theta_2)}\right).$$

As the re-projection factor is different for each double difference, the accuracy for the baseline can be improved by computing a weighted sum of all double difference contributions, the weight being inversely proportional to the re-projection factor.

A simple form of the carrier phase observables may be written as:

$$\Delta \cdot \varphi_1^1(t_i) = \|(P^1 - P_1)\| - c \cdot (\tau_1(t_i) - \tau^1(t_i)) - \lambda \cdot N_1^1$$

$$\Delta \cdot \varphi_2^1(t_i) = \|(P^1 - P_2(t_i))\| - c \cdot (\tau_2(t_i) - \tau^1(t_i)) - \lambda \cdot N_2^1$$

$$\Delta \cdot \varphi_1^j(t_i) = \|(P^j - P_1)\| - c \cdot (\tau_1(t_i) - \tau^j(t_i)) - \lambda \cdot N_1^j$$

$$\Delta \cdot \varphi_2^j(t_i) = \|(P^j - P_2(t_i))\| - c \cdot (\tau_2(t_i) - \tau^j(t_i)) - \lambda \cdot N_2^j$$

where,
λ is GPS L1 wavelength
$\varphi_r^s(t_i)$ is the fractional L1 carrier phase measured at receiver r (r={1,2}) from sat s (in fraction of cycles)
$P^s$ is the position of satellite s
$P_1$ is the first (fixed) position
$P_2(t_i)$ is the second position of the receiver at time $t_i$
$\tau^s(t_i)$ is the clock offset at satellite s at time $t_i$ (in seconds)
$\tau_r(t_i)$ is the clock offset at receiver r at time $t_i$ (in seconds)
$N_r^s$ is the integer number of wavelength ambiguities from satellite s to receiver r, on the total distance from satellite to receiver.

The Single difference equations may be written as:

$$\lambda \cdot (\varphi_2^1(t_i) - \varphi_1^1(t_i)) = (P_2(t_i) - P_1) \cdot \cos \Theta^1 - c \cdot (\tau_2(t_i) - \tau_1(t_i)) - \lambda \cdot (N_2^1 - N_1^1)$$

$$\lambda \cdot (\varphi_2^j(t_i) - \varphi_1^j(t_i)) = (P_2(t_i) - P_1) \cdot \cos \Theta^j - c \cdot (\tau_2(t_i) - \tau_1(t_i)) - \lambda \cdot (N_2^j - N_1^j)$$

$\Theta^s$ is the angle between the baseline from position 1 to position 2, and the direction of satellite s.

The double difference equations may be written as:

$$\lambda \cdot [(\varphi_2^1(t_i) - \varphi_1^1(t_i)) - (\varphi_2^j(t_i) - \varphi_1^j(t_i))] =$$
$$(P_2(t_i) - P_1) \cdot (\cos\Theta^{-1} - \cos\Theta^j) - \lambda \cdot [(N_2^1 - N_1^1) - (N_2^j - N_1^j)]$$

$$(P_2(t_i) - P_1) = \frac{\lambda}{(\cos\Theta^1 - \cos\Theta^j)} \cdot [(N_2^1 - N_1^1) - (N_2^j - N_1^j)] +$$
$$\frac{\lambda}{(\cos\Theta^1 - \cos\Theta^j)} \cdot [(\varphi_2^1(t_i) - \varphi_1^1(t_i)) - (\varphi_2^j(t_i) - \varphi_1^j(t_i))]$$

The minimum step size for the double difference ambiguity increase (or decrease) is ±1. The associated (discrete) step size for P1 to P2 distance is $$\frac{\lambda}{(\cos\Theta^1 - \cos\Theta^j)}$$

and can be larger than λ.

When the likelihood function of $(P_2(t_i) - P_1)$ is plotted against the integer double difference a set of periodic Gaussian functions is obtained, with a period mean value of $$\frac{\lambda}{(\cos\Theta^1 - \cos\Theta^j)}$$

and a standard deviation of $$2 * \frac{\lambda}{(\cos\Theta^1 - \cos\Theta^j)}$$

Each distinct pair of satellites provides one corresponding likelihood function, with a corresponding periodicity and the fractional phase or offset.

The overall likelihood function may be determined as the product of all likelihood functions by pairs of satellite, multiplied by the likelihood VIO function (centered around vector combination of VIO), with a standard deviation combination of the VIO displacement estimate error.

In some embodiments, for an "integer solution", each "float" value of the double difference ambiguity is replaced by its closest integer. Each double difference provides a new integer estimate of VIO, weighted with the back-projected standard deviation. The final VIO displacement estimate is the weighted average of all the individual estimates.

As outlined above, disclosed hybrid GNSS-VIO position determination methods permit position determination even when there are discontinuities in phase tracking. Disclosed embodiments facilitate carrier phase integer reconstruction even when tracking is lost between two times t1 and t2.

Figure 7:
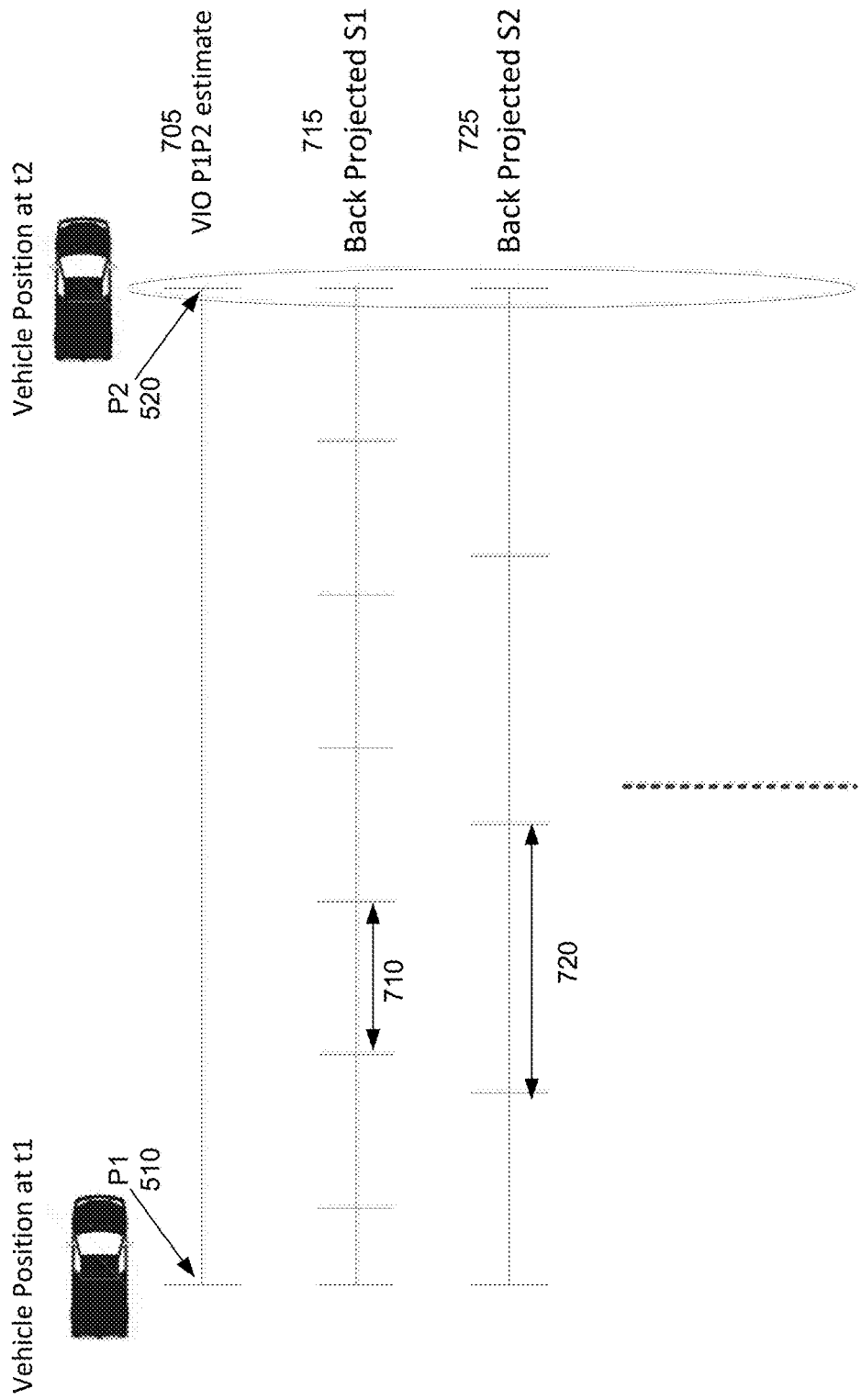
FIG. 7 shows that VIO or another non-GNSS positioning estimate of relative displacement between points P1 610 and P2 620 may be used to back project and resolve integer ambiguities for SVs 280-1 and 280-2.

FIG. 7 illustrates back projection using VIO or another non-GNSS positioning estimate of relative displacement between points P1 510 and P2 520 to resolve integer ambiguities for SVs 280-1 and 280-2.

FIG. 7 shows the same baseline distance D12 680, with different back projected single difference measurements. The first VIO distance estimate is the direct VIO distance estimate 705, the second VIO distance estimate 715 is the back projected single difference of the satellite 280-1 with periodicity 710, the third VIO distance estimate 725 is the back projected single difference of the satellite 280-2 with periodicity 720, and so on. All these measurements pertain to the same baseline distance, but with periodic structures of different periodicities. Given the known accuracy of the direct VIO distance estimate 705, a set comprising the number of periodicities associated with each VIO distance estimate (e.g. 715, 725 . . . ) may be determined. A relative displacement between points P1 510 and P2 520 may thus be determined where the non zero domains of the likelihood functions are aligned with each other. In some embodiments, the VIO displacement estimate may be obtained as a maximum of the combined likelihood function.

Figure 8A:
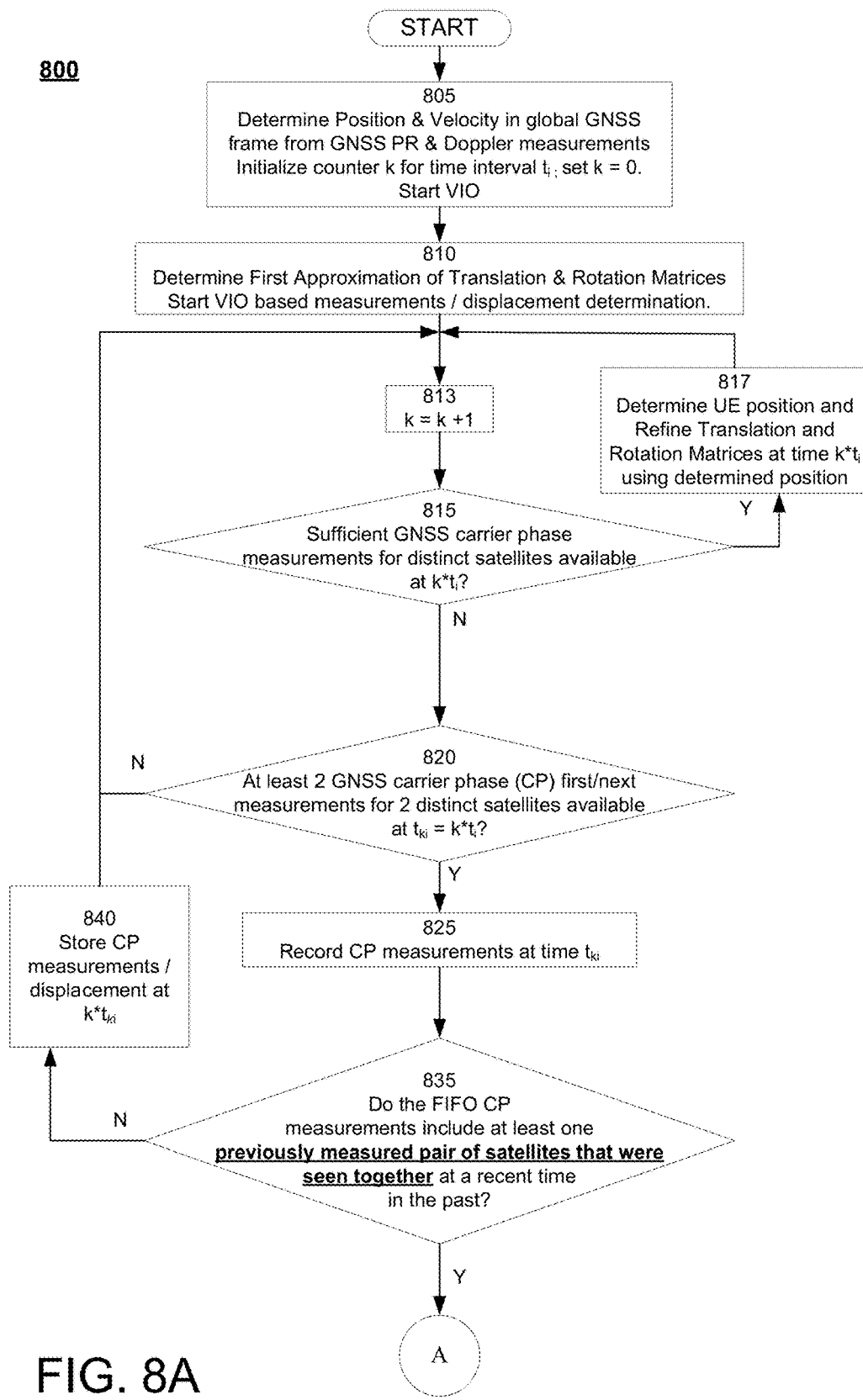
FIGS. 8A and 8B show an exemplary method 800 for hybrid GNSS-VIO or hybrid GNSS-non-GNSS position determination in accordance with some disclosed embodiments.
Figure 8B:
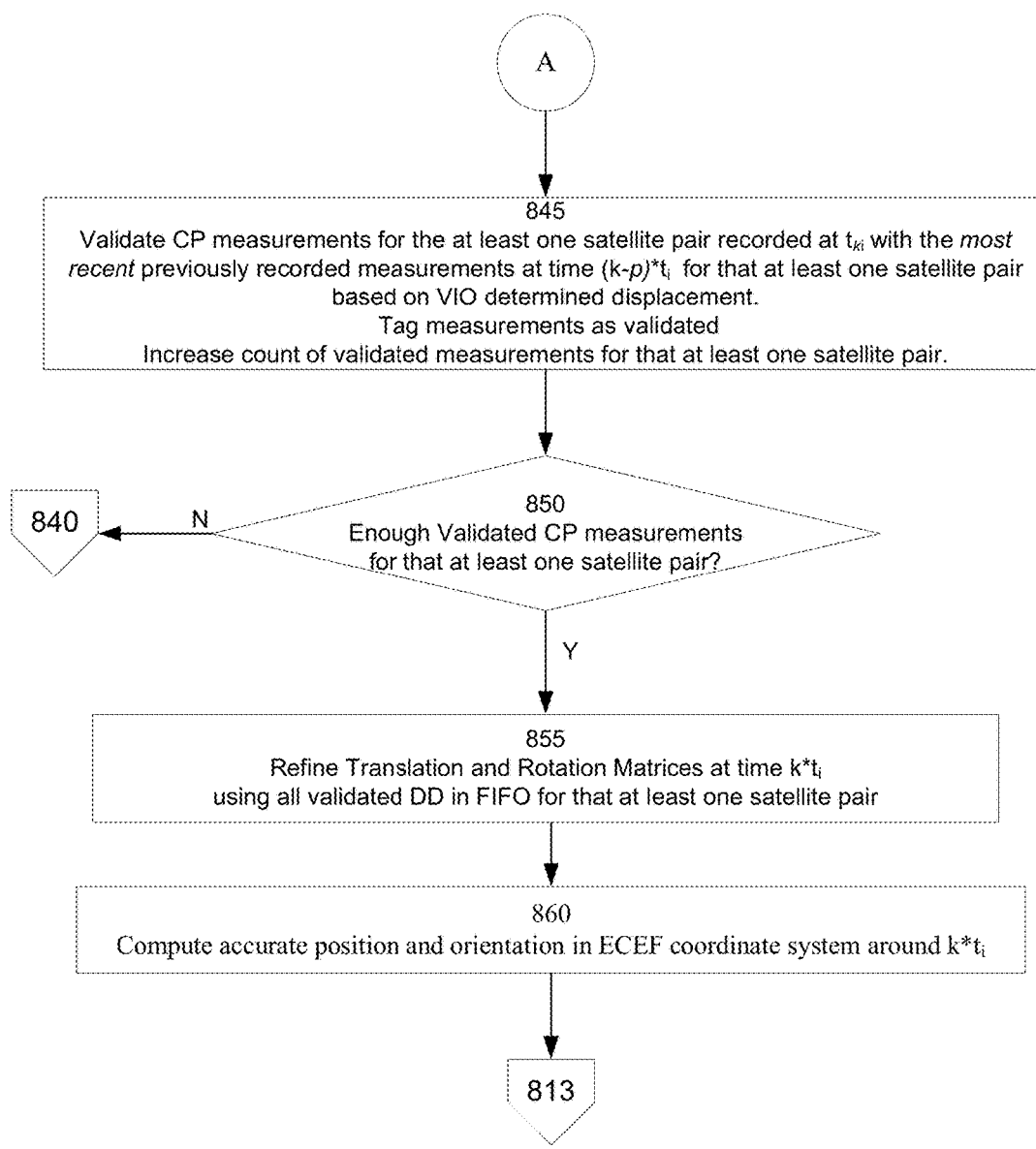

FIG. 8 shows an exemplary method 800 for hybrid GNSS-VIO or hybrid GNSS-non-GNSS position determination in accordance with some disclosed embodiments. In some embodiments, method 800 may be performed by a single UE 100. In some embodiments, method 800 may be performed by processor(s) 150 and one or more of PE 156 or CVP 155 on UE 100.

In the method below GNSS carrier phase measurements and/other VIO/sensor measurements may be taken and recorded by UE periodically at some specified time interval $t_i$. For example, every $t_i$ time units starting at a time $t_0$. Corresponding timestamped VIO and GNSS CP measurements may also be recorded and stored in memory. Further, the measurements may be stored in a FIFO. The FIFO may be indexed by satellite pairs and/or a separate FIFO may be maintained for each satellite pair for which measurements have been obtained within some specified time interval of the current time.

In some embodiments, in block 805, an initial position estimate and velocity estimate for UE 100 may be determined, for example, in absolute co-ordinates from GNSS measurements, or by any other suitable approach. For example, the position may be determined in Earth Centric Earth Fixed (ECEF) coordinate frame. In some embodiments, for example, when using GNSS, the initial position estimate and velocity estimate of UE 100 may be determined from pseudorange and Doppler measurements. In some embodiments, the initial position estimate may be an approximate location. For example, the inaccuracy associated with the initial position estimate may be of the order of 100 m or more.

Further, in some embodiments, in block 805, a counter "k", which maintains a count of the number of elapsed time intervals $t_{ki} = k*t_i$ since the initial position estimate at time $t_0$ is initialized and set to 0. In some embodiments, in block 805, a VIO process may be started. In some embodiments, the VIO process may run continuously to independently determine the relative position and displacement of UE 100.

In some embodiments, in block 810, VIO-ECEF Rotation and Translation Matrices, which may include parameters to convert relative VIO measurements in the local VIO coordinate system to an absolute coordinate system (e.g. ECEF), may be initialized. In some embodiments, the initial position estimate of UE 100 at time $t_0$ may be selected as the origin of a local VIO coordinate system. For example, the VIO frame of reference may be initialized with one axis in the vertical direction and with the initial orientation set at 0. VIO based displacement and camera pose (or UE pose) may be obtained in 6 Degrees of Freedom (6DOF) in the VIO local frame of reference. All the subsequent VIO positions and orientations will be cumulated translations and rotations from this initial position. In some embodiments, VIO-ECEF rotation and translation matrices may be determined based on the initial position of UE 100 in the absolute reference frame and the initial position of UE 100 in the local VIO reference frame.

In block 813, the counter k may be incremented and UE may attempt to obtain the first/next available GNSS carrier phase measurements.

In block 815, at a first or next time $t_{ki}$, if a sufficient number of GNSS carrier phase measurements are available ("Y" in block 815), then, in block 817, the position of UE 100 may be obtained based on the available GNSS carrier phase measurements. Further, the determined position of UE 100 may be used to refine the VIO-ECEF translation and rotation matrices. In some embodiments, the VIO determined position may be corrected based on the refined VIO-ECEF translation and rotation matrices. The process may then return to block 813.

In some embodiments, if the number of satellites for which GNSS carrier phase measurements are available is insufficient to determine the position of UE 100 ("N" in block 815), then, in block 820, the availability of corresponding GNSS carrier phase measurements for at least one pair of corresponding satellites is determined.

In some embodiments, in block 820, if corresponding GNSS measurements for at least one pair of corresponding satellites are not available ("N" in block 820), then, another iteration is begun at block 813. Further, in some embodiments, the VIO determined position and displacement at time $t_{ki}=k*t_i$ may be stored in memory 130.

If corresponding GNSS measurements for at least one pair of corresponding satellites are available ("Y" in block 820), then, in block 825, at time $t_{ki}$, the available GNSS measurements may be recorded. In general, if GNSS carrier phase measurements for "n" satellites are available, then, the measurements may be grouped by satellite pairs so that a total of $$\frac{n*(n-1)}{2}$$

measurements corresponding to distinct pairs of satellites may be obtained from the measurements of the n satellites. In some embodiments, satellites for which GNSS carrier phase measurements are available may be grouped in pairs and the measurements associated with one or more satellite pairs may be stored in a FIFO in memory 130 of UE 100.

In some embodiments, in block 835, the FIFO (in memory 130 of UE 100) may be checked to determine if the CP measurements in the FIFO include prior CP measurements for at least one pair of currently (at time $t_{ki}$) measured satellites that were previously measured together within some time window of the current time.

If the FIFO does not include prior measurements for at least one pair of currently measured satellites within the time window ("N" in step 835), then, in block 840, the GNSS carrier phase measurements for time $t_{ki}$ may be stored and counter k is incremented prior to beginning another iteration in block 813.

If the FIFO includes prior measurements within some time window for some number q (q≥1) pairs of currently measured satellites ("N" in step 835), then, in block 845, the most recent of prior carrier phase measurements for the q currently measured satellite pairs may be validated.

If the most recent of prior measurements for the q currently measured satellite pairs occurred at time $t_{(k-p)*i}=(k-p)*t_i$, then, the validation may be determined from the double difference of the snapshots of the carrier phase observables for the r (r≤q) satellite pairs that were measured both at time $t_{ki}$ and time $t_{(k-p)*i}$. In some embodiments, the double difference of the snapshots of the carrier phase observables for the r satellite pairs measured at times $t_{ki}$ and time $t_{(k-p)*i}$ may be projected onto the baseline and validated against VIO displacement that occurred during the time interval $p*t_i$ between $k*t_i$ and $(k-p)*t_i$.

In some embodiments, the VIO displacement in between times $t_i$ and $t_{(k-p)*i}$ may be determined based on the difference between the VIO determined UE pose at time $k*t_i$ and the VIO determined UE pose at time $(k-p)*t_i$. The VIO pose of the UE at given time may be determined by tracking features in images captured by a camera coupled to the UE and/or IMU measurements. For each of the r satellite pairs, corresponding measurements that are validated may be tagged as validated and a corresponding count of validated measurements for the satellite pair may be incremented. For example, a subset s (s≤r) of the r satellite pairs may be tagged as validated and, for each of the s satellite pairs, the corresponding count of validated measurements may be increased.

In some embodiments, in block 850, the number of validated measurements for each of the s satellite pairs is compared to a threshold.

If, for each of the s validated measurements, the corresponding number of validated measurements is less than the threshold ("N" in step 850), then, in block 840, the GNSS carrier phase measurements for time $t_{ki}$ may be stored and counter k is incremented prior to beginning another iteration in block 813.

If, for at least one of the s validated measurements, the corresponding number of validated measurements is not less than the threshold ("Y" in step 850), then, in block 855, the translation and rotation matrices at time $k*t_i$ may be determined based on the at least one validated double difference measurement in s.

Further, in block 855, a corrected VIO displacement, which compensates for the VIO drift, may then be determined using Vernier's principle (e.g. as described above in relation to FIGS. 6 and 7). In some embodiments, based on the corrected accurate VIO determined displacement, the double difference traditional observables may be recomputed, and integer ambiguities may be solved. For example, several likelihood functions with different respective periodicities may be used along with the estimated VIO/non-GNSS measurement to determine a maximum of all the likelihood functions. In some embodiments, the maximum of all the likelihood functions may be determined as that displacement where all the non zero domains of each likelihood function are aligned with each other within the known accuracy of the VIO measurement.

In some embodiments, based on the at least one validated double difference measurement in s traditional double difference equations may be formed and the known double difference integer ambiguities may be injected into the equations.

In some embodiments, corrections to all independent parameters of translation and rotation matrices may be determined using global bundle adjustment. In global bundle adjustment, multiple double differences (for the same satellite pairs) measured at multiple time instants are used for matrix corrections at multiple instants. The depth of the bundle estimation may be adjusted depending on the severity of the VIO drift. The depth of the FIFO may also be adjusted accordingly. In some embodiments, the corrections, which compensate for translational and rotational VIO drift, may yield accurate translation and rotation matrices, which may permit determination of the VIO determined pose in absolute coordinates.

In block 860, the position of UE 100 may be computed in absolute coordinates (e.g. ECEF coordinates). The rotation and translation matrices solved for in step 855 are directly used for absolute position computation.

Figure 9:
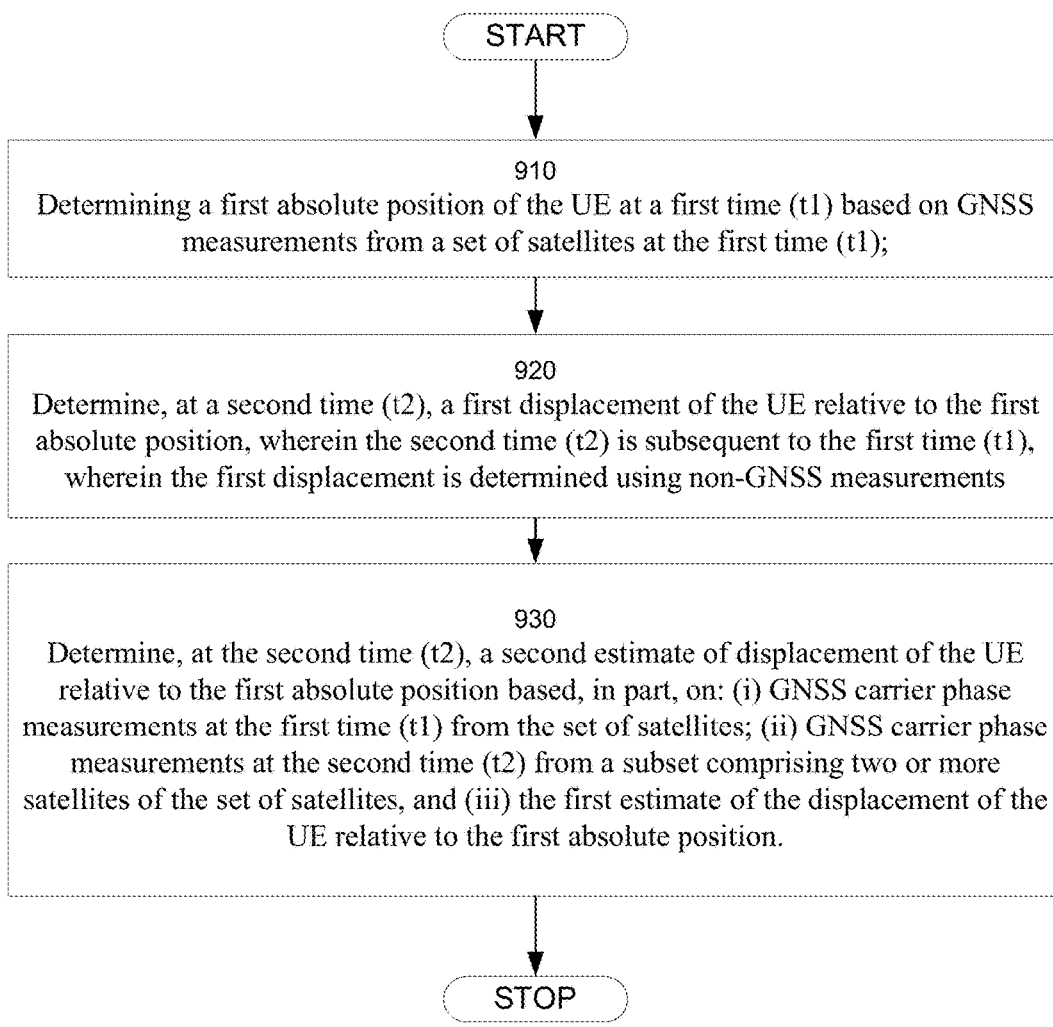
FIG. 9 shows an exemplary method 900 for hybrid GNSS-non-GNSS position determination in accordance with some disclosed embodiments

FIG. 9 shows an exemplary method 900 for hybrid GNSS-VIO or hybrid GNSS-non-GNSS position determination in accordance with some disclosed embodiments. In some embodiments, method 900 may be performed by a single UE 100. In some embodiments, method 900 may be performed by processor(s) 150 and one or more of PE 156 or CVP 155 on UE 100.

In some embodiments, in block 910, a first absolute position of the UE at a first time (t1) may be determined (e.g. by UE 100) based on GNSS measurements from a set of satellites at the first time (t1). In some embodiments, the first absolute position of the UE at a first time (t1) may be determined and/or obtained using any appropriate method.

In some embodiments, in block 920, at a second time (t2), a first displacement of the UE relative to the first absolute position may be determined, wherein the second time (t2) is subsequent to the first time (t1), wherein the displacement is determined using non-GNSS measurements.

The non-GNSS measurements may include one or more of: Visual Inertial Odometry (VIO) measurements, and/or measurements provided by an IMU, and/or Light Detection and Ranging (LIDAR) measurements, and/or Radio Detection And Ranging (RADAR) measurements. In some embodiments, the VIO measurements used to determine displacement may be based, at least in part, on: tracking a plurality of features across a plurality of images captured by a camera coupled to the UE to obtain a 6 Degrees of Freedom (6DOF) pose of the UE relative to the first absolute position, wherein the plurality of images are captured in a time interval between the first time (t1) and the second time (t2), or tracking optical flow from the plurality of images.

In some embodiments, in block 930, a second estimate of the displacement of the UE relative to the first absolute position may be determined at the second time (t2) based, in part, on: (a) GNSS carrier phase measurements at the second time (t2) from a subset comprising two or more satellites of the set of satellites, and (b) the first estimate of the displacement of the UE.

In some embodiments, the GNSS carrier phase measurements for satellites in the set may be unavailable between the first time (t1) and the second time (t2); or intermittently available between the first time (t1) and the second time (t2), or continuously available between the first time (t1) and the second time (t2). As one example, all or part of GNSS measurements may be unavailable between times t1 and t2 because of: a temporary loss of lock and/or discontinuities and/or interruptions of GNSS signals; various environmental (including atmospheric, geographical, etc) conditions that may detrimentally affect reception and/or reliability of GNSS signals; and/or non-availability of GNSS signals. In embodiments such as ADAS, the second estimate of the displacement of the UE may be used, for example, to correct drift, biases, or other errors of the non GNSS sensor.

In some embodiments, the second estimate of the displacement of the UE may be determined by resolving a corresponding carrier phase ambiguity for each satellite in the subset based, in part, on: (a) GNSS carrier phase measurements for satellites in the subset at the first time (t1), and (b) the first estimate of displacement of the UE. In some embodiments, the corresponding carrier phase ambiguity for each satellite in the subset of two or more satellites may be resolved by: determining one or more satellite pairs in the subset of two or more satellites, and projecting, for each satellite pair of the one or more satellite pairs in the subset, a corresponding periodic likelihood function on to a baseline represented by the first estimate of the displacement of the UE. Each periodic likelihood function may be based on the corresponding double differenced GNSS carrier phase measurement for the satellite pair. Further, a combined likelihood function may be determined as a function of the corresponding periodic likelihood functions for the one or more satellite pairs and a non-periodic likelihood function corresponding to the baseline. Integral carrier phase ambiguities for each satellite may then be determined based, in part, on the combined likelihood function. In some embodiments, a second estimate of displacement of the UE may be determined based, in part, on a maximum of the combined likelihood function and the first absolute position.

In some embodiments, a second absolute position of the UE may be determined based on the second estimate of displacement of the UE. In some embodiments, the method may further include correcting one or more of: a plurality rotational parameters, or a plurality of translational parameters, wherein the rotational parameters and the translational parameters are used to transform the non-GNSS measurements from a local coordinate system to an absolute coordinate system used to represent the first absolute position and the second absolute position.

The methodologies described herein in flow charts and message flows may be implemented by various means depending upon the application. For example, these methodologies may be implemented in hardware, firmware, software, or any combination thereof. For a hardware implementation, the processor 1152 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Although the disclosure is illustrated in connection with specific embodiments for instructional purposes, the disclosure is not limited thereto. Various adaptations and modifications may be made without departing from the scope Therefore, the spirit and scope of the appended claims should not be limited to the foregoing description.

What is claimed is:

1. A method on a user equipment (UE), the method comprising:
   determining, by the UE, a first absolute position of the UE at a first time (t1) based on GNSS measurements from a set of satellites at the first time (t1);
   determining, by the UE at a second time (t2), a first estimate of displacement of the UE relative to the first absolute position, wherein the second time (t2) is subsequent to the first time (t1), wherein the first estimate of displacement is determined using non-GNSS measurements; and
   determining, by the UE at the second time (t2), a second estimate of displacement of the UE relative to the first absolute position based, in part, on:
      GNSS carrier phase measurements at the first time (t1) from the set of satellites, and
      GNSS carrier phase measurements at the second time (t2) from a subset comprising two or more satellites of the set of satellites, and
      the first estimate of displacement of the UE.

2. The method of claim 1, wherein the GNSS carrier phase measurements for satellites in the set are:
- unavailable between the first time (t1) and the second time (t2); or
- available intermittently between the first time (t1) and the second time (t2); or
- available continuously between the first time (t1) and the second time (t2).

3. The method of claim 1, wherein determining the second estimate of displacement comprises:
- resolving a corresponding carrier phase ambiguity for each satellite in the subset based, in part, on: the GNSS carrier phase measurements for satellites in the subset at the first time (t1), and the first estimate of displacement of the UE.

4. The method of claim 3, wherein resolving the corresponding carrier phase ambiguity for each satellite in the subset of two or more satellites comprises:
- determining one or more satellite pairs in the subset of two or more satellites;
- projecting, for each satellite pair of the one or more satellite pairs in the subset, a corresponding periodic likelihood function on to a baseline represented by the first estimate of displacement, wherein each periodic likelihood function is based on the corresponding double differenced GNSS carrier phase measurement for the satellite pair;
- determining a combined likelihood function, the combined likelihood function being determined as a function of the corresponding periodic likelihood functions for the one or more satellite pairs and a non-periodic likelihood function corresponding to the baseline; and
- determining integral carrier phase ambiguities for each satellite based, in part, on the combined likelihood function.

5. The method of claim 4, further comprising:
- determining the second estimate of displacement based, in part, on a maximum of the combined likelihood function and the first absolute position.

6. The method of claim 1, further comprising:
- determining a second absolute position of the UE at the second time (t2), based, in part, on the on the first absolute position and the second estimate of displacement.

7. The method of claim 6, wherein determining the second absolute position comprises:
- correcting one or more of:
  - a plurality of rotational parameters, or
  - a plurality of translational parameters,
- based on the second estimate of displacement, wherein the rotational parameters and the translational parameters are used to transform the non-GNSS measurements from a local coordinate system to an absolute coordinate system used to represent the first absolute position and the second absolute position.

8. The method of claim 7, wherein determining the second absolute position comprises:
- determining the second absolute position based, in part, on one or more of: the corrected plurality of rotational parameters, or the corrected plurality of translational parameters.

9. The method of claim 1, wherein the non-GNSS measurements comprise one or more of:
- Visual Inertial Odometry (VIO) measurements, or
- measurements provided by an IMU, or
- Light Detection and Ranging (LIDAR) measurements, or
- Radio Detection And Ranging (RADAR) measurements.

10. The method of claim 9, wherein the VIO measurements are based, at least in part, on:
- tracking a plurality of features across a plurality of images captured by a camera coupled to the UE to obtain a 6 Degrees of Freedom (6DOF) pose of the UE relative to the first absolute position, wherein the plurality of images are captured in a time interval between the first time (t1) and the second time (t2), or
- tracking optical flow from the plurality of images.

11. A User Equipment (UE) comprising:
- a Global Navigation Satellite System (GNSS) receiver capable of performing GNSS measurements;
- at least one non-GNSS displacement sensor;
- a memory to store the GNSS measurements and the measurements by the at least one non-GNSS displacement sensor; and
- a processor coupled to the GNSS receiver, the memory, and the at least one non-GNSS displacement sensor, wherein the processor is configured to:
- determine a first absolute position of the UE at a first time (t1) based on GNSS measurements from a set of satellites at the first time (t1);
- determine, at a second time (t2), a first estimate of displacement of the UE relative to the first absolute position, wherein the second time (t2) is subsequent to the first time (t1), wherein the first estimate of displacement is determined using non-GNSS measurements from the at least one non-GNSS displacement sensor; and
- determine, at the second time (t2), a second estimate of displacement of the UE relative to the first absolute position based, in part, on:
  - GNSS carrier phase measurements at the first time (t1) from the set of satellites, and
  - GNSS carrier phase measurements at the second time (t2) from a subset comprising two or more satellites of the set of satellites, and
  - the first estimate of displacement of the UE.

12. The UE of claim 11, wherein the GNSS carrier phase measurements for satellites in the set are:
- unavailable between the first time (t1) and the second time (t2); or
- available intermittently between the first time (t1) and the second time (t2); or
- available continuously between the first time (t1) and the second time (t2).

13. The UE of claim 11, wherein to determine the second estimate of displacement, the processor is configured to:
- resolve a corresponding carrier phase ambiguity for each satellite in the subset based, in part, on the GNSS carrier phase measurements for satellites in the subset at the first time (t1), and the first estimate of displacement of the UE.

14. The UE of claim 13, wherein to resolve the corresponding carrier phase ambiguity for each satellite in the subset of two or more satellites, the processor is configured to:
- determine one or more satellite pairs in the subset of two or more satellites;
- project, for each satellite pair of the one or more satellite pairs in the subset, a corresponding periodic likelihood function on to a baseline represented by the first estimate of displacement, wherein each periodic likelihood function is based on the corresponding double differenced GNSS carrier phase measurement for the satellite pair;

determine a combined likelihood function, the combined likelihood function being determined as a function of the corresponding periodic likelihood functions for the one or more satellite pairs and a non-periodic likelihood function corresponding to the baseline; and determine integral carrier phase ambiguities for each satellite based, in part, on the combined likelihood function.

15. The UE of claim 14, wherein the processor is further configured to:
determine the second estimate of displacement based, in part, on a maximum of the combined likelihood function and the second absolute position.

16. The UE of claim 11, wherein the processor is further configured to:
determine a second absolute position of the UE at the second time (t2) based, in part, on the first absolute position and the second estimate of displacement.

17. The UE of claim 16, wherein, to determine a second absolute position of the UE, the processor is configured to:
correct one or more of:
a plurality of rotational parameters, or
a plurality of translational parameters,
based on the second estimate of displacement, wherein the plurality of rotational parameters and the plurality of translational parameters are used to transform the non-GNSS measurements from a local coordinate system to an absolute coordinate system used to represent the first absolute position and the second absolute position.

18. The UE of claim 16, wherein, to determine a second absolute position of the UE, the processor is configured to:
determine the second absolute position based, in part, on one or more of: the corrected plurality of rotational parameters, or the corrected plurality of translational parameters.

19. The UE of claim 11, wherein the non-GNSS displacement sensor comprises one or more of:
a Visual Inertial Odometry (VIO) sensor, or
an Inertial Measurement Unit (IMU), or
a Light Detection and Ranging (LIDAR) sensor, or
a Radio Detection And Ranging (RADAR) sensor.

20. The UE of claim 11, wherein:
the non-GNSS displacement sensor comprises a VIO sensor, and VIO measurements from the VIO sensor are obtained based, at least in part, on:
tracking a plurality of features across a plurality of images captured by a camera coupled to the UE to obtain a 6 Degrees of Freedom (6DOF) pose of the UE relative to the first absolute position, wherein the plurality of images are captured in a time interval between the first time (t1) and the second time (t2), or
tracking optical flow from the plurality of images.

21. A User Equipment (UE) comprising:
Global Navigation Satellite System (GNSS) receiving means capable of performing GNSS measurements;
at least one non-GNSS displacement sensing means to determine UE displacement;
means for determining a first absolute position of the UE at a first time (t1) based on GNSS measurements from a set of satellites at the first time (t1);
means for determining, at a second time (t2), a first estimate of displacement of the UE relative to the first absolute position, wherein the second time (t2) is subsequent to the first time (t1), wherein the first estimate of displacement is determined using non-GNSS measurements determined by the at least one non-GNSS displacement sensing means; and means for determining, at the second time (t2), a second estimate of displacement of the UE relative to the first absolute position based, in part, on:
GNSS carrier phase measurements at the first time (t1) from the set of satellites, and
GNSS carrier phase measurements at the second time (t2) from a subset comprising two or more satellites of the set of satellites, and
the first estimate of displacement of the UE.

22. The UE of claim 21, wherein the GNSS carrier phase measurements for satellites in the set are:
unavailable between the first time (t1) and the second time (t2); or
available intermittently between the first time (t1) and the second time (t2); or
available continuously between the first time (t1) and the second time (t2).

23. The UE of claim 21, wherein the means for determining the second estimate of displacement of the UE at the second time (t2) comprises:
means for resolving a corresponding carrier phase ambiguity for each satellite in the subset based, in part, on the GNSS carrier phase measurements for satellites in the subset at the first time (t1), and the first estimate of displacement.

24. The UE of claim 21, further comprising:
means for determining a second absolute position of the UE at the second time (t2) based, in part, on the first absolute position and the second estimate of displacement.

25. A non-transitory computer readable medium comprising instructions, which when executed by a processor, cause the processor to:
determine a first absolute position of a User Equipment (UE) at a first time (t1) based on Global Navigation Satellite System (GNSS) measurements from a set of satellites at the first time (t1);
determine, at a second time (t2), a first estimate of displacement of the UE relative to the first absolute position, wherein the second time (t2) is subsequent to the first time (t1), wherein the first estimate of displacement is determined using non-GNSS measurements; and
determine, at the second time (t2), a second estimate of displacement of the UE relative to the first absolute position based, in part, on:
GNSS carrier phase measurements at the first time (t1) from the set of satellites, and
GNSS carrier phase measurements at the second time (t2) from a subset comprising two or more satellites of the set of satellites, and
the first estimate of displacement of the UE.

26. The computer-readable medium of claim 25, wherein the GNSS carrier phase measurements for satellites in the set are:
unavailable between the first time (t1) and the second time (t2); or
available intermittently between the first time (t1) and the second time (t2); or
available continuously between the first time (t1) and the second time (t2).

27. The computer readable medium of claim 25, wherein the instructions to determine the second estimate of displacement cause the processor to:
resolve a corresponding carrier phase ambiguity for each satellite in the subset based, in part, on GNSS carrier phase measurements for satellites in the subset at the first time (t1), and the first estimate of displacement.

28. The computer readable medium of claim 27, wherein the instructions to resolve the corresponding carrier phase ambiguity for each satellite in the subset of two or more satellites cause the processor to:

determine one or more satellite pairs in the subset of two or more satellites;

project, for each satellite pair of the one or more satellite pairs in the subset, a corresponding periodic likelihood function on to a baseline represented by the first estimate of displacement, wherein each periodic likelihood function is based on the corresponding double differenced GNSS carrier phase measurement for the satellite pair;

determine a combined likelihood function, the combined likelihood function being determined as a function of the corresponding periodic likelihood functions for the one or more satellite pairs and a non-periodic likelihood function corresponding to the baseline; and determine integral carrier phase ambiguities for each satellite based, in part, on the combined likelihood function.

29. The computer readable medium of claim 28, wherein the instructions further cause the processor to:

determine the second estimate of displacement based, in part, on a maximum of the combined likelihood function and the first absolute position.

30. The computer readable medium of claim 25, wherein the instructions to further cause the processor to:

determine a second absolute position of the UE at the second time (t2) based, in part, on the first absolute position and the second estimate of displacement.

* * * * *